(12) United States Patent
Hadar et al.

(10) Patent No.: US 8,104,775 B2
(45) Date of Patent: Jan. 31, 2012

(54) DOLLY WITH ELASTICALLY SUSPENDED LOAD-BEARING SURFACE

(75) Inventors: Nir Hadar, Hadera (IL); Gideon Feiner, Ramat Hasharon (IL)

(73) Assignee: Polymer Logistics (Israel) Ltd., Raanana (IL)

( * ) Notice: Subject to any disclaimer, the term of this patent is extended or adjusted under 35 U.S.C. 154(b) by 97 days.

(21) Appl. No.: 12/208,453

(22) Filed: Sep. 11, 2008

(65) Prior Publication Data
US 2010/0059951 A1  Mar. 11, 2010

(51) Int. Cl.
*B60G 17/00* (2006.01)
(52) U.S. Cl. ......... 280/6.159; 221/58; 221/59; 312/306; 312/312
(58) Field of Classification Search .............. 221/56, 221/58, 59, 192, 279; 312/306–312; 280/6.15, 280/6.153, 6.157, 6.151, 6.159; 187/213, 187/263, 240
See application file for complete search history.

(56) References Cited

U.S. PATENT DOCUMENTS

| | | | |
|---|---|---|---|
| 2,444,776 A | 7/1948 | Kalning et al. | |
| 3,091,503 A * | 5/1963 | Fisher | 312/71 |
| 4,009,915 A * | 3/1977 | Whitelaw et al. | 312/71 |
| 6,000,770 A * | 12/1999 | Frich | 312/319.7 |
| 6,035,973 A | 3/2000 | Neal et al. | |
| 6,450,369 B1 | 9/2002 | Hyde | |
| 2006/0112864 A1* | 6/2006 | Ni | 108/55.1 |
| 2007/0059119 A1* | 3/2007 | Hadar | 410/46 |

FOREIGN PATENT DOCUMENTS

| | | |
|---|---|---|
| DE | 102006061841 | 7/2008 |
| FR | 2666553 | 3/1992 |
| FR | 2757490 | 6/1998 |
| GB | 2440699 | 2/2008 |
| WO | WO 2007/113829 | 10/2007 |

* cited by examiner

*Primary Examiner* — J. Allen Shriver, II
*Assistant Examiner* — Erez Gurari
(74) *Attorney, Agent, or Firm* — Mark M. Friedman

(57) ABSTRACT

A dolly or pallet equipped with an elastically suspended load-bearing surface so as to responsively move downwards as materials are loaded and move upwards as loads are removed thereby reducing variation in the height of the top of the stack. The elastic suspension elements are connected to suspension support structures configured to fold into a compact folded position to facilitate storage and return transport and to unfold into a fully erected position at the time of use.

37 Claims, 35 Drawing Sheets

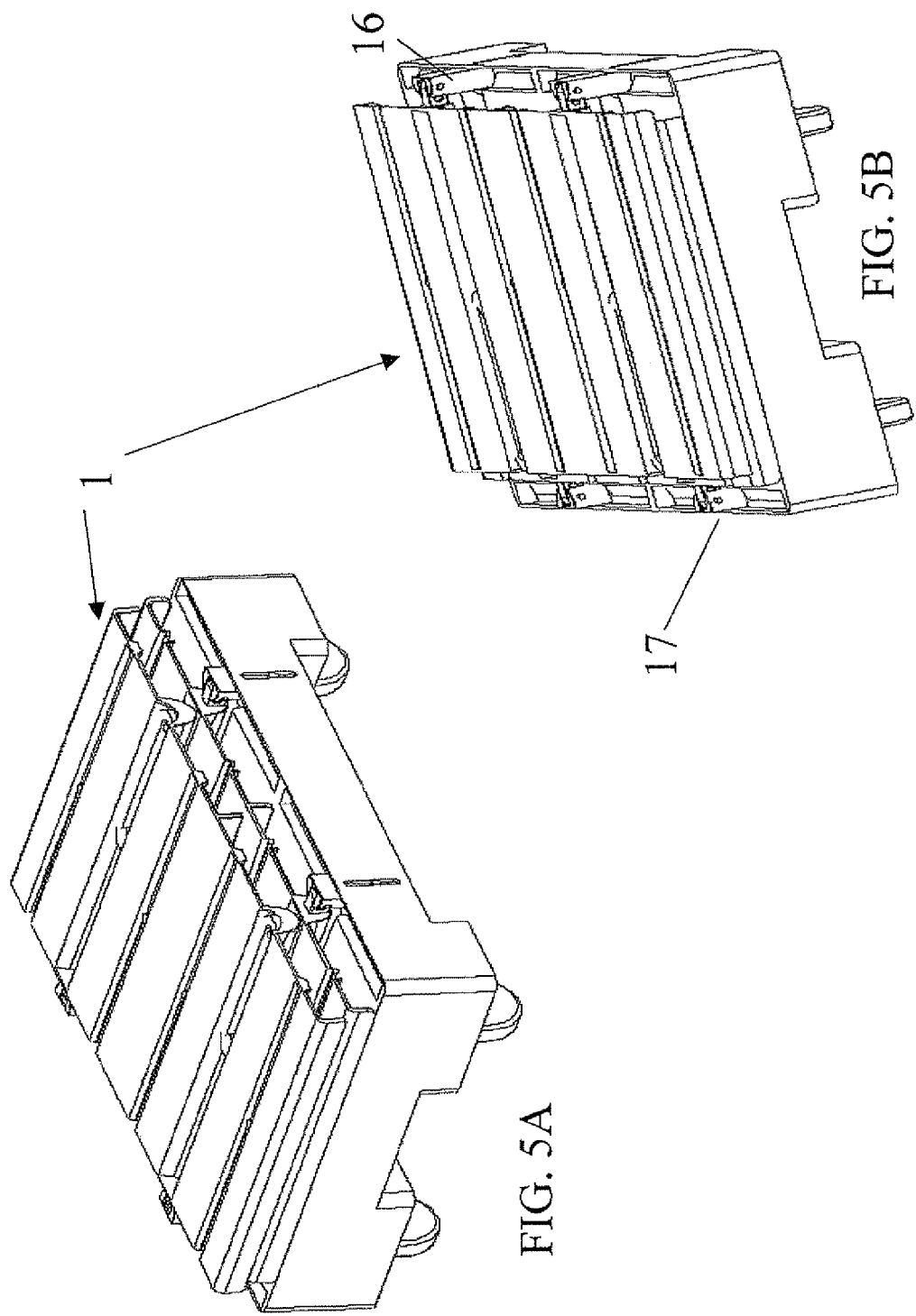

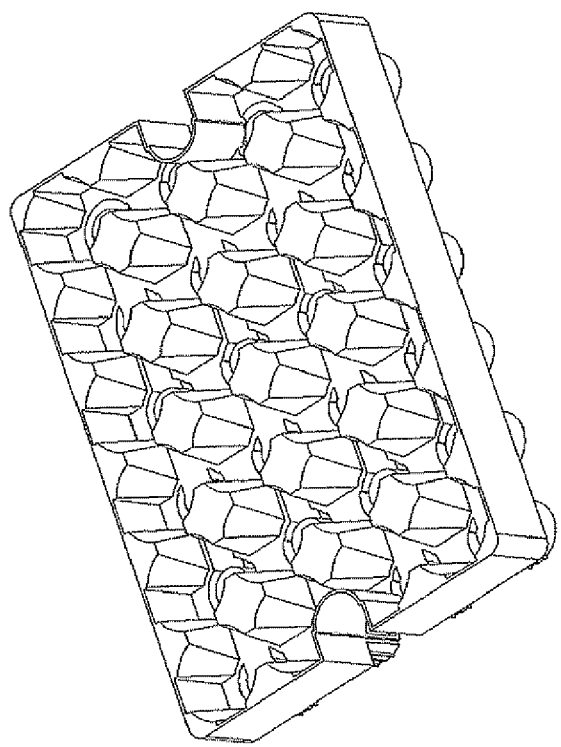
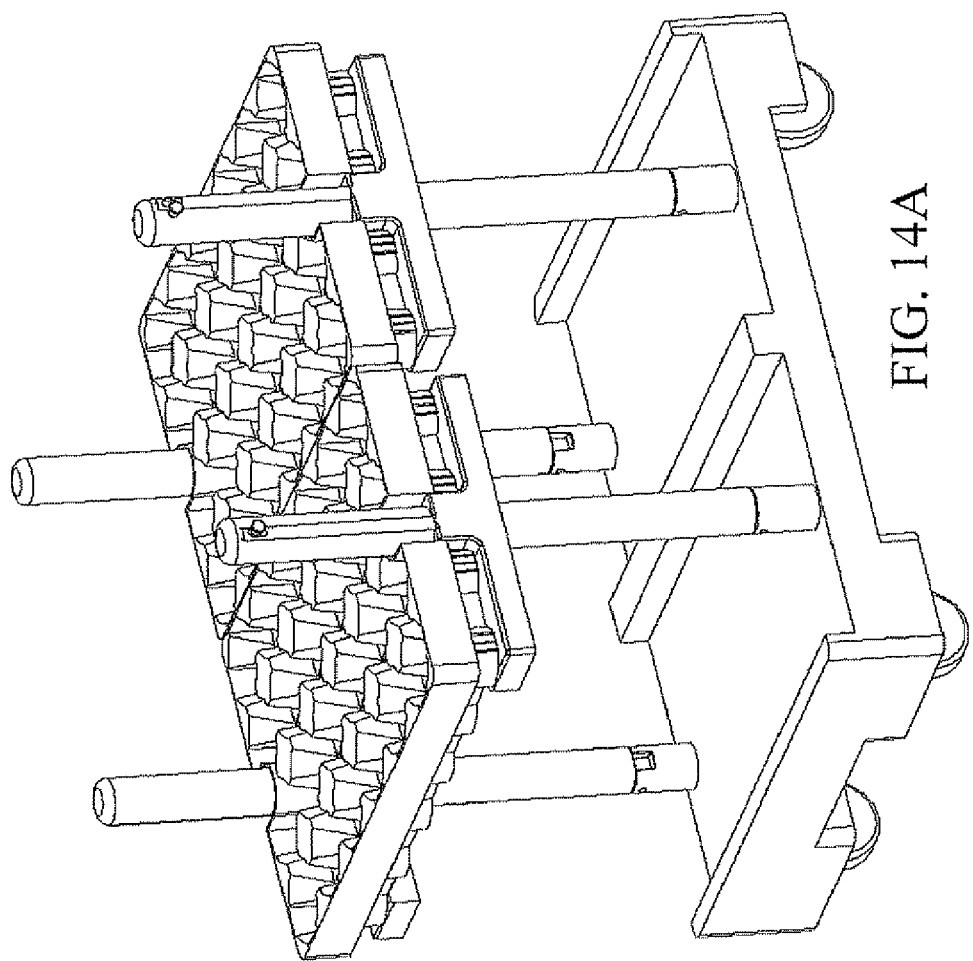
FIG. 14B
FIG. 14A

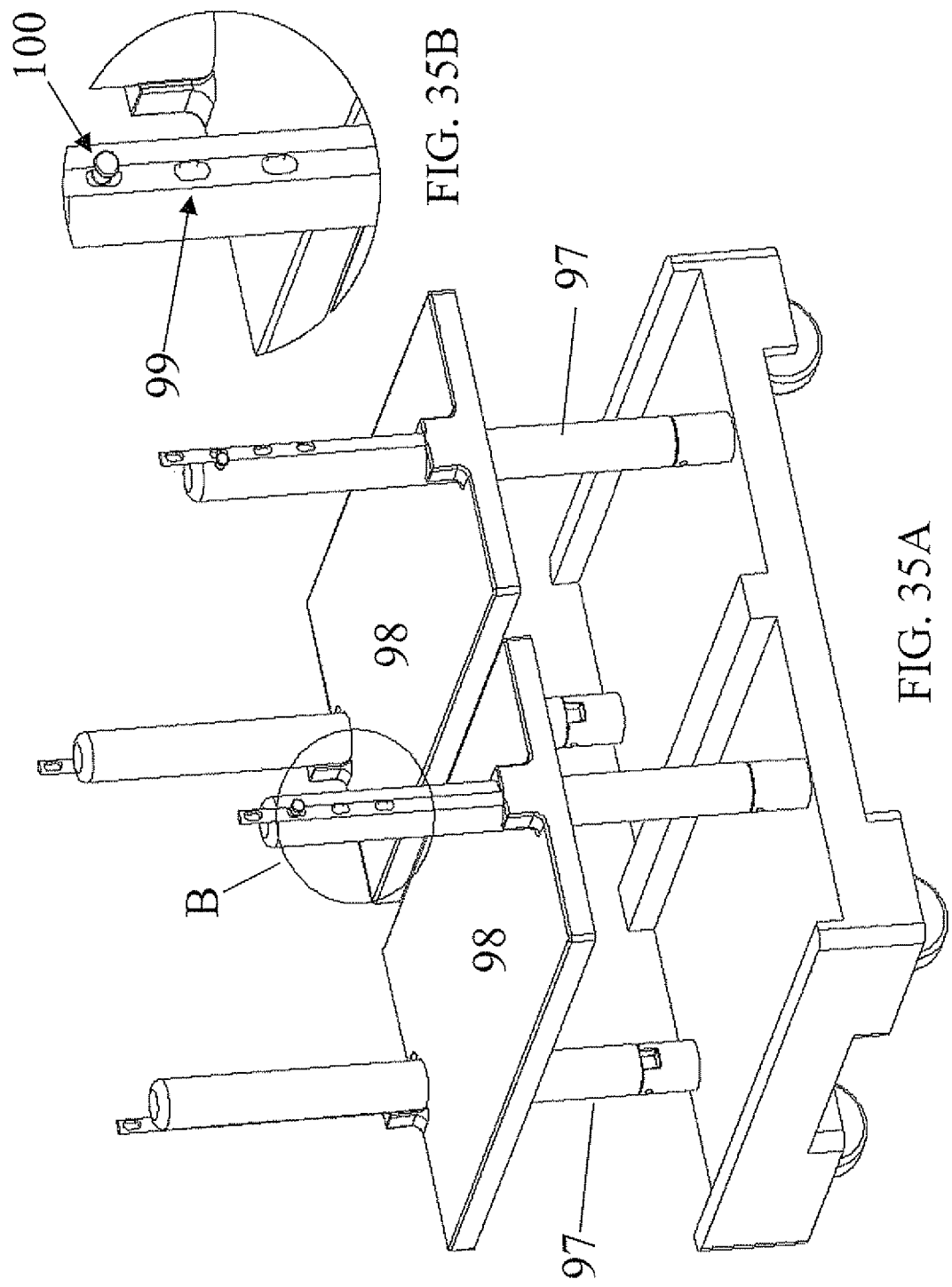

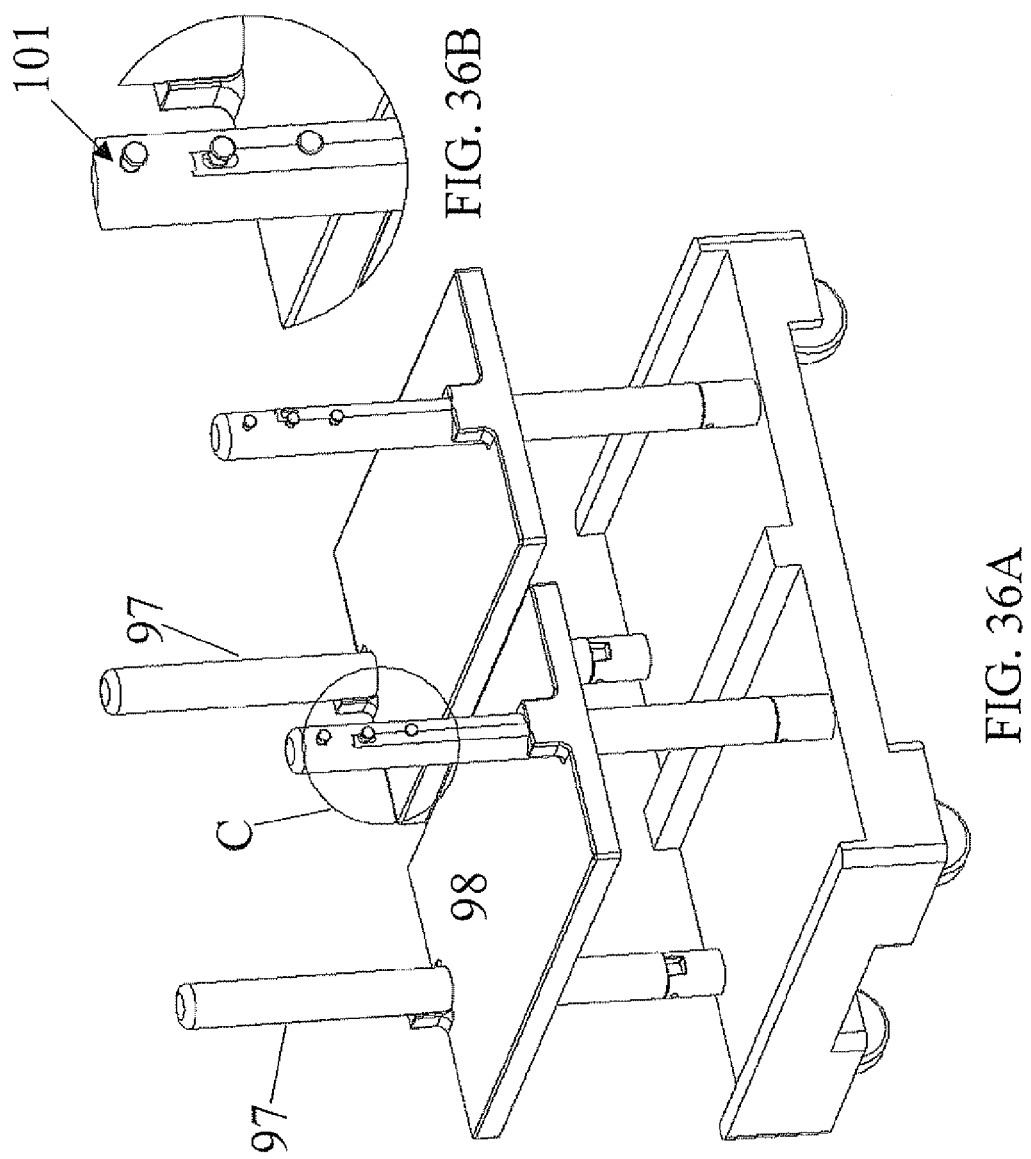

DOLLY WITH ELASTICALLY SUSPENDED LOAD-BEARING SURFACE

FIELD AND BACKGROUND OF THE INVENTION

The present invention relates to dollies and pallets and, in particular, it concerns dollies and pallets with an elastically suspended load-bearing surface useful in carrying and displaying merchandise.

A growing trend in the retail industries is the transferring of goods on dollies or pallets from a warehouse or receiving station to a retail outlet and displaying the goods while still loaded on the dollies or the pallets. This greatly reduces the labor involved in transferring the goods to a display units and arranging merchandise displays. As stated above, the present invention is particularly related to both dollies and pallets, typically constructed from metal, wood, molded plastic materials or combinations thereof.

When dollies are used for dispensing goods, the "top of the stack" moves downwards as the upper items are removed. This may make it more awkward for a customer to access the goods, requiring him or her to bend over and reach downwards to take the remaining goods. Additionally, there is a negative psychological effect according to which the goods left at the lower height is perceived by customers as "left over" or old, and hence is considered less desirable.

A solution presented the field of shipping containers, disclosed in PCT Patent Application Publication No. WO2007/113829, addresses this problem by suspending the floor from the existing walls. Such a solution is however non-applicable to pallets and dollies.

Therefore, for these and other reasons, it would be advantageous to provide a dolly or pallet equipped with a self-raising floor that would tend to raise the remaining part of a stack as goods are removed from the top of the stack.

SUMMARY OF THE INVENTION (a) The present invention is a non-enclosed load-bearing structure for handling materials comprising: (a) a base structure; (b) a suspension support arrangement connected to said base structure, said suspension support arrangement being configured to provide a plurality of suspension locations; (c) at least one load-bearing surface vertically displaceable relative to said support arrangement; and (d) a suspension arrangement including a plurality of elastic suspension elements, said elastic suspension elements being deployed so as to suspend said at least one load-bearing surface relative to said suspension locations such that, when said load-bearing surface is loaded with a load, said load-bearing surface assumes a lowered position and, when a part of the load is removed, said suspension arrangement raises said load-bearing surface towards a raised position.

According to a further feature of the present invention, there is also provided wheels disposed on said base structure so said load-bearing structure operatives as a dolly.

According to a further feature of the present invention, there is also provided a spacer arrangement fixedly attached to said base structure so said load-bearing structure operates as a pallet.

According to a further feature of the present invention, there is also provided a spacer arrangement fixedly attached to said base structure so said load-bearing structure operates as a pallet.

According to a further feature of the present invention, the suspension support arrangement is implemented as a detachable structure deployed by attachment to said base structure.

According to a further feature of the present invention, the suspension support arrangement is implemented as a folding entity deployable between an upright support-providing position and a folded position.

According to a further feature of the present invention, the folding entity includes at least one pair of folding support structures disposed on opposite sides of said base structure.

According to a further feature of the present invention, the pair of folding support structures are implemented outside a rectangle best approximating the usable area of said load-bearing surface so as to provide a maximum amount of said load-bearing surface as usable area.

According to a further feature of the present invention, the pair of folding support structures are implemented on the inside of the rectangle best approximating the usable surface of said load-bearing surfaces so as to enable adjacent arrangement of a plurality said load-bearing structures.

According to a further feature of the present invention, the pair of folding support structures disposed on opposite sides of said load-bearing structure are positioned so as to fold into non-overlapping folded positions.

According to a further feature of the present invention, the pair of folding support structures disposed on opposite sides of said load-bearing structure are positioned so as to fold into non-overlapping folded positions According to a further feature of the present invention, the pair of folding support structures disposed on opposite sides of said load-bearing structure are positioned opposite each other and hinged so as to fold into non-overlapping folded positions.

According to a further feature of the present invention, the pair of folding support structures disposed on opposite sides of said load-bearing structure are positioned opposite each other wherein the pivot arrangement of a first of said folding support structures is disposed higher than the pivot arrangement of a second of said folding support structure so as to enable said pair of folding support structures to fold into an overlapping folded position.

According to a further feature of the present invention, the pair of folding support structures and said vertically displaceable, load-bearing surface are implemented so as to enable the folding of support structures while said load-bearing surfaces are in a raised position.

According to a further feature of the present invention, the pairs of support structures are implemented so as to extend around at least one corner of said load-bearing structure so as to isolate protruding corners of materials loaded on said load-bearing surface from items in the area surrounding said load-bearing structure.

According to a further feature of the present invention, there is also provided a vertical partition disposed between two of said load-bearing surfaces suspended by said suspension arrangement so as to isolate materials loaded on a first of said load-bearing surfaces from materials loaded on a second of said load bearing surfaces.

According to a further feature of the present invention, the pair of support structures includes a stopper arrangement of stopper blocks, each of said stopper blocks being attached to each of said support structures so as to define a fully raised position.

According to a further feature of the present invention, there is also provided a connection arrangement including a series of engagement configurations disposed along the length of each of said elastic suspension elements and a complementary configuration is disposed in each of said support structures so that said elastic suspension elements may be selectively connected to said support structures.

According to a further feature of the present invention, there is also provided a connection arrangement including a series of engagement configurations disposed along the height of each of said support structures and a corresponding configuration disposed on each of said elastic suspension elements so that said elastic suspension elements may be selectively connected to said support structures.

According to a further feature of the present invention, the pairs of support structures are implemented as elongated pairs of support structures including a plurality of vertical slots spaced-apart wherein said vertical slots are engaged by pins associated with said load-bearing surfaces so as to maintain a horizontal orientation of said load-bearing surface moving along said vertical slots and to define a fully raised position.

According to a further feature of the present invention, the at least one load-bearing surface includes a shelf spanning at least one horizontal dimension of said load-bearing surface.

According to a further feature of the present invention, the shelf further includes said elastic suspension elements disposed such that the lower extremity of each said suspension elements are rigidly fixed to the underside of said shelf at point removed from the edge where said elastic suspension elements emerge from said shelf wherein said point of attachment is greater than the width of said shelf thereby providing elastic elongation along both the horizontal and the vertical lengths of said elastic suspension elements.

According to a further feature of the present invention, the at least one load-bearing surface includes catch structures configured to hold an adapted carry structure.

According to a further feature of the present invention, the at least one load-bearing surface is implemented as an adapted shelf separate from said load-bearing structure wherein each of two opposing edge surfaces of said adapted shelf possesses a shape complementary to said support structures so as to maintain a horizontal orientation of said adapted shelf while moving vertically along said pair of support structures.

According to a further feature of the present invention, the at least one load-bearing surface is implemented as a base of a container separate from said load-bearing structure bearing structure of claim 1, wherein said suspension arrangement further includes an adjustment mechanism disposed in said load-bearing surface, said adjustment mechanism being configured for adjusting an effective length of said elastic suspension elements.

According to a further feature of the present invention, the adjustment mechanism is configured to adjust an effective length of said elastic suspension elements between an operative length wherein said at least one load-bearing surface is elastically biased towards a raised position and an operative length wherein said at least one load-bearing surface assumes said lowered position even in the absence of an applied load.

According to a further feature of the present invention, the adjustment mechanism is configured to simultaneously adjust an effective length of all of said elastic suspension elements.

According to a further feature of the present invention, the adjustment mechanism is configured to simultaneously adjust an effective length of all of said elastic suspension elements substantially equally.

According to a further feature of the present invention, the adjustment mechanism includes a rotatable drum associated with said at least one load-bearing surface, each of said elastic suspension elements being linked to said drum so that rotation of said drum effects simultaneous adjustment of an effective length of all of said elastic suspension elements.

According to a further feature of the present invention, adjustment mechanism further includes a handle accessible from an upper surface of said at least one load-bearing surface for manually rotating said drum.

According to a further feature of the present invention, the adjustment mechanism further includes a locking arrangement for locking said drum in at least one position relative to said at least one load-bearing surface.

According to a further feature of the present invention, the rotation of said drum to shorten an effective length of said elastic suspension elements and to inhibit rotation of said drum to lengthen an effective length of said elastic suspension elements.

According to a further feature of the present invention, the adjustment mechanism further includes a ratchet override mechanism selectively operable to release said ratchet arrangement to allow rotation of said drum to lengthen an effective length of said elastic suspension elements.

According to a further feature of the present invention, the plurality of elastic suspension elements includes redundant sets of said elastic suspension elements, said redundant sets being configured so that selective deployment of each of said sets defines a new load-to-displacement profile for said at least one load-bearing surface.

According to a further feature of the present invention, the redundant sets of said elastic suspension elements include a plurality of subsets of said elastic suspension elements, each of said subsets being configured to provide identical load-to-displacement profiles when deployed.

According to a further feature of the present invention, the plurality of subsets of said elastic suspension elements are configured to be concurrently deployable.

According to a further feature of the present invention, there is also provided biasing units associated with each of said redundant sets of elastic suspension elements, said biasing units being configured to retract each of said elastic suspension elements underneath associated at least one load-bearing surface when said elastic suspension elements are in an non-deployed state.

According to a further feature of the present invention, there're is also provided at least one roller blind for providing a display front, said roller blind being configured to unwind from a roller into an extended position spanning the height between said at least one load-bearing surface and said load-bearing structure as said at least one floor moves upwards and rewinds onto said roller as said at least one load-bearing surface moves downwards.

According to a further feature of the present invention, each of said elastic suspension elements is anchored at an anchoring location associated with said support arrangement in spaced relation to the corresponding one of said suspension locations such that a first portion of said elastic suspension element extends from said anchoring location to said suspension location and a second portion of said elastic suspension element extends from said suspension location to said load-bearing surface, both said first and second portions of said elastic suspension element being tensioned by application of a load to said load-bearing surface.

There is also provided according to the teachings of the present invention a non-enclosed load-bearing structure for handling materials comprising: (a) a base structure; (b) suspension support arrangement implemented as a folding structure deployable between an upright support-providing position and a folded position, (c) at least one load bearing-surface vertically displaceable relative to said support arrangement; and (d) a suspension arrangement including a plurality of elastic suspension elements, said elastic suspension elements being deployed so as to suspend said at least one load-bearing surface relative to said support arrangement such that, when said load-bearing surface is loaded with a load, said load-bearing surface assumes a lowered position and, when a part of the load is removed, said suspension arrangement raises said load-bearing surface towards a raised position.

There is also provided according to the teachings of the present invention a container for use with a dolly or pallet having a suspension arrangement including an upright support structure deployed at least partially within a footprint of the dolly or pallet, the container comprising: (a) a base having a generally rectangular loadable area; (b) a set of walls deployed to cooperate with said base to define a contained volume of the container, wherein said base and said walls have a generally rectangular outline as viewed from above modified by at least one recessed region formed in at least one of said walls, said recessed region lying inwards of said generally rectangular outline so as to provide an upright channel for receiving at least part of the upright support structure within the generally rectangular outline.

According to a further feature of the present invention, the set of walls are rigidly fixed to said base and configured to allow nesting of the container with another identical container.

According to a further feature of the present invention, the set of walls are foldably linked to said base to form a foldable container.

There is also provided according to the teachings of the present invention a tray for use with a dolly or pallet having a suspension arrangement including an upright support structure deployed at least partially within a footprint of the dolly or pallet, the container comprising: a shaped tray formed with a two-dimensional array of shaped holders, each holder configured for receiving an item to be carried on said shaped tray, wherein said shaped tray has a generally rectangular outline as viewed from above modified by at least one recessed region at at least one of edge of said shaped tray, said recessed region lying inwards of said generally rectangular outline so as to provide an upright channel for receiving at least part of the upright support structure within the generally rectangular outline.

According to a further feature of the present invention, the two-dimensional array has at least one irregularity in spacing between said holders adjacent to said recessed region.

BRIEF DESCRIPTION OF THE DRAWINGS

The invention is herein described, by way of example only, with reference to the accompanying drawings, wherein:

FIGS. 3, 4A, 4B, 5A and 5B are isometric views of the dolly of FIG. 1 at different stages of folding.

FIG. 14A is an isometric view of the dolly of FIG. 13 loaded with adapted beverage trays.

FIG. 14B is an isometric view of an adapted beverage tray of FIG. 14A.

FIG. 35A is an isometric view of a variant implementation of the dolly of FIG. 10A in which the elastic suspension elements are provided with a plurality of attachment points for adjusting the starting height and/or suspension force acting on the load-bearing surface.

FIG. 35B is an enlarged view of the region of FIG. 35A designated "B".

FIG. 36A is an isometric view of a variant implementation of the dolly of FIG. 10A in which the elastic suspension elements are provided with a plurality of attachment pins for adjusting the starting height and/or suspension force acting on the load-bearing surface.

FIG. 36B is an enlarged view of the region of FIG. 36A designated "C".

DESCRIPTION OF THE PREFERRED EMBODIMENTS

Figure 1:
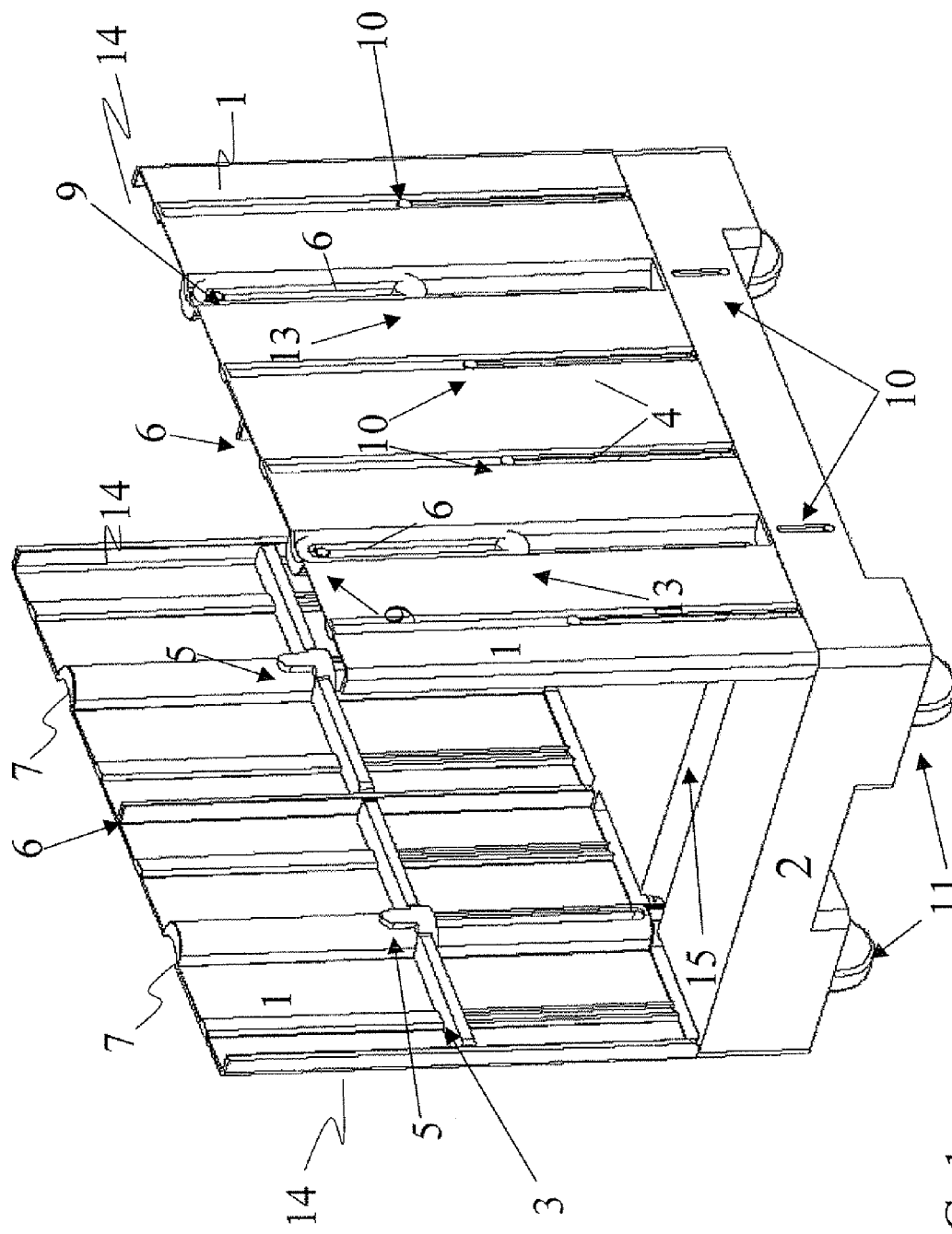
FIG. 1 is an isometric view of an extended support embodiment of a dolly with an elastically suspended load-bearing surface, constructed and operative according to the teachings of the present invention.
Figure 2B:
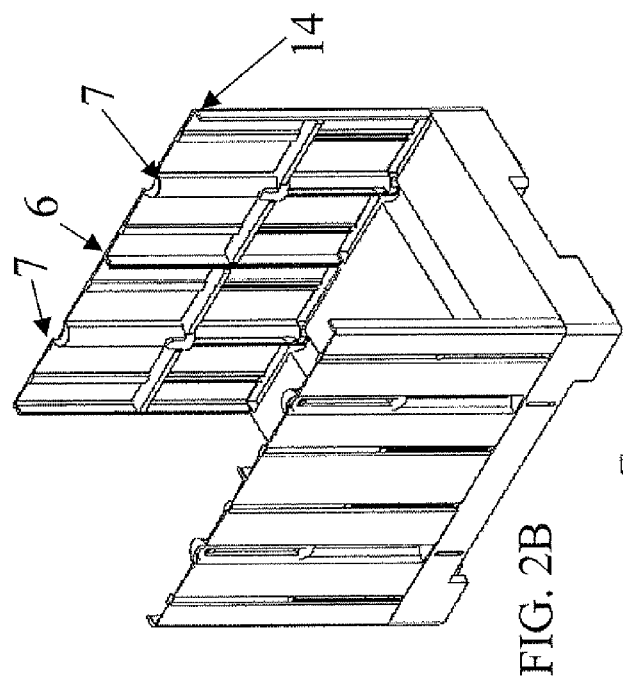
FIGS. 2A-2D are a top view, an isometric view, a side view and an end view, respectively, of the dolly of FIG. 1.
Figure 2D:
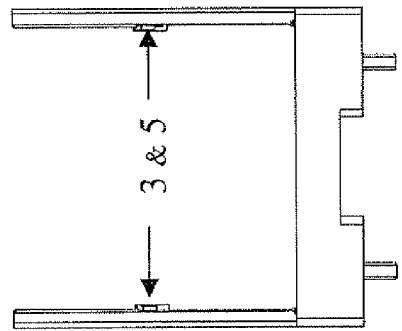
Figure 2A:
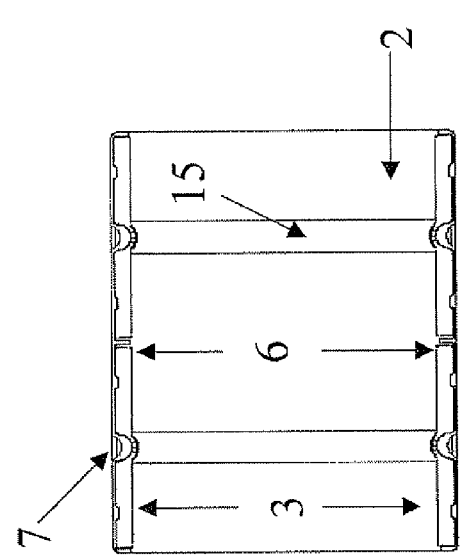
Figure 2C:
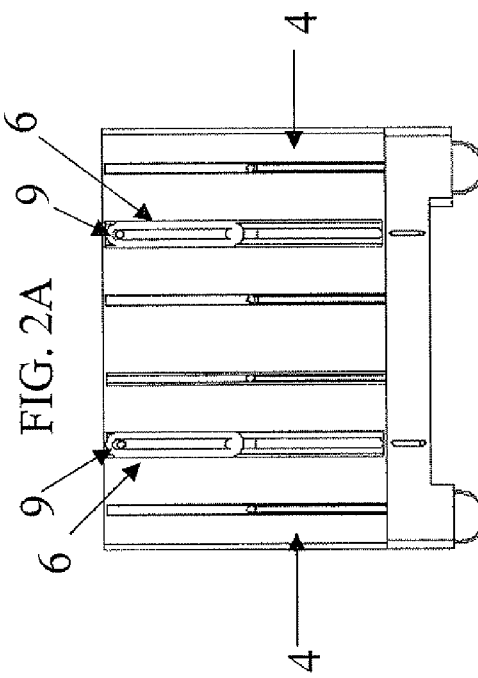
Figure 3:
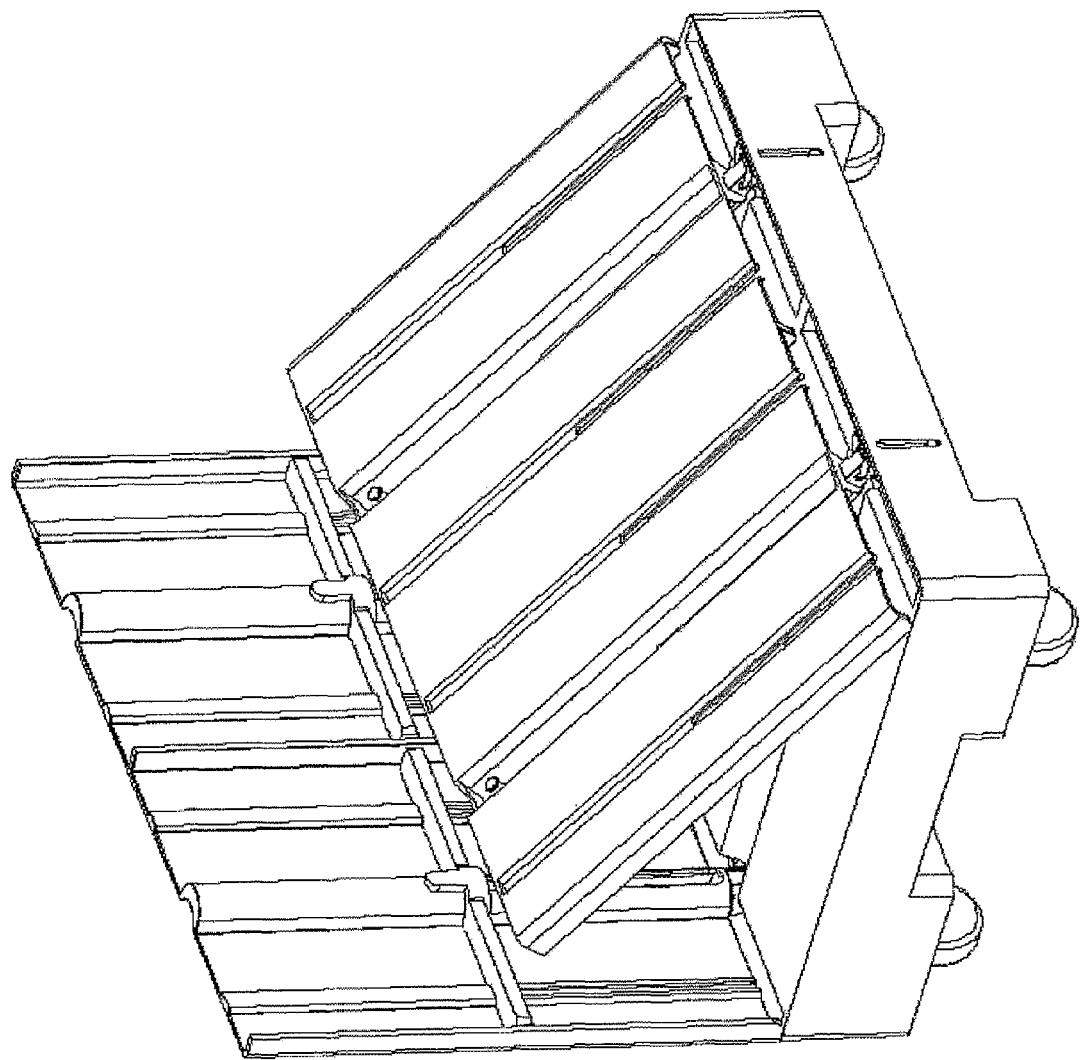
Figure 4B:
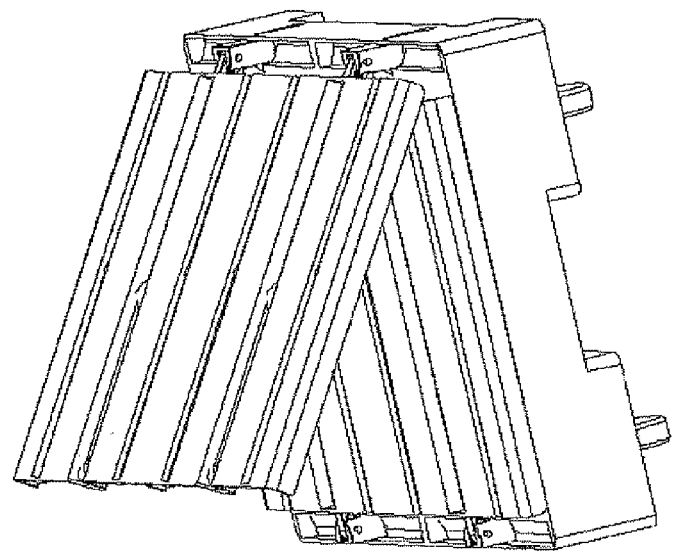
Figure 4A:
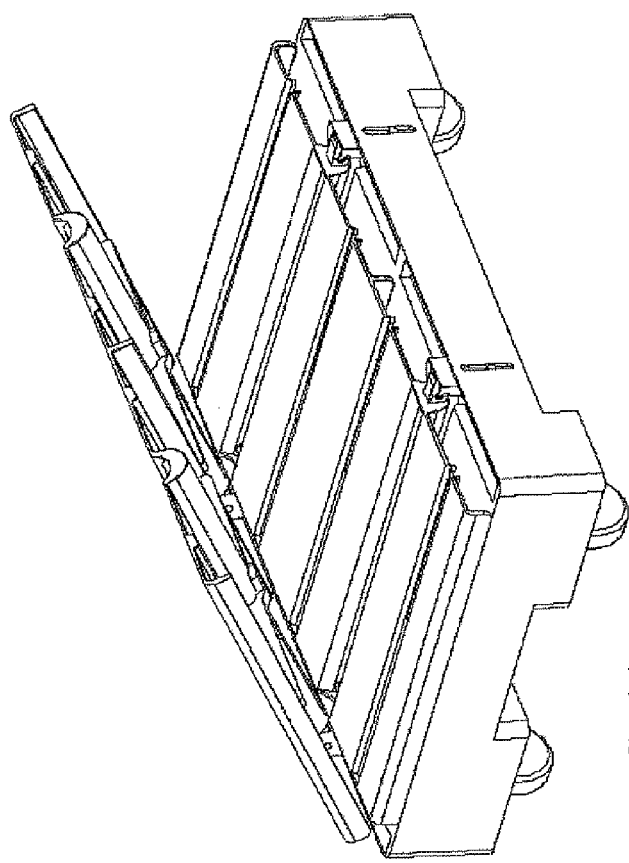

The present invention relates to dollies and pallets equipped with vertically displaceable load-bearing surfaces configured to move downwards as materials are added and to move upwards to a predefined height as the loaded materials are removed. Such functionality reduces the physical effort and potential back strain involved in bending to load or unload materials to and from the customarily low load-bearing surfaces of dollies and pallets. When the dolly and/or pallet serves in an additional capacity as a display unit, the upward biasing of the load-bearing surface at least partially offsets variations in the display height, thereby mitigating the "bottom of the pile" disadvantages described above. This functionality is accomplished by elastically suspending the load-bearing surface via a suspension system appropriate for the expected load. The present invention overcomes the design challenge of providing a suspension arrangement for a dolly or pallet, i.e., a non-enclosed load-bearing structure where there are no walls from which to hang a suspension structure. This is done be providing the dolly or pallet with a dedicated support structures from which the load-bearing surface is suspended.

It should be noted that the underlying concept of the present invention may be applied to a wide range of variant implementations. Specifically, there are a number of primary variables according to which the various implementations may be grouped, and any and all combinations of these variables are encompassed within the broad scope of the present invention. Thus, for example:

A number of different support structures will be described, whether based on elongated wall-like structures or localized support pillars, and whether located within the normal footprint of the dolly or projecting outside the normal footprint. All such variants are applicable in all combinations with each of the other sets of variable implementations, even where the specific combination is not discussed.

Similarly, certain implementations illustrated herein provide a plurality of independently displaceable load-bearing surfaces each of which moves up and down depending upon its current load independent of each other, while other implementations employ a single load-bearing surface for the entire dolly surface. Here too, each of these options may be combined with all other variant implementations.

Additionally, certain of the implementations described employ a shelf as part of the dolly assembly to provide the load-bearing surface while other implementations rely on the lowest container or stackable tray of the system to provide the load-bearing surface by which the rest of the load is supported.

Each of these options will be discussed further below with reference to the corresponding drawings. At this stage, it will be helpful to define certain terminology as will be used herein in the description and claims. Firstly, the term "non-enclosed load-bearing structure" is used herein as a generic term for devices such as dollies and pallets which are used for supporting and transporting a load. This terminology distinguishes dollies and pallets from various types of crates and shipping containers which have a floor surrounded by walls. However, it should be noted that "non-enclosed" only excludes devices which are surrounded by walls. In certain embodiments to be described below, the non-enclosed load-bearing structures of the present inventions may in fact have wall-like structures along two entire sides.

The term "dolly" is used to refer to a subset of non-enclosed load-bearing structures in which a set of wheels, typically four in number, support the device over the ground or floor to facilitate moving of the structure with its load.

The term "pallet" is used herein to refer to a subset of non-enclosed load-bearing structures in which feet, skids or some other spacer elements define channels or openings into which forks of a mechanized lifting arrangement (e.g., forklift truck) can be inserted for the purpose of lifting the load bearing structure together with its load. Pallets preferably have non-rolling contact surfaces.

It should be noted that the terms "dolly" and "pallet" as defined herein are not necessarily mutually exclusive. For example, the functionality of both types of device may be combined, such as a convertible dolly-pallet device. A particularly preferred example of a convertible dolly-pallet device which may be used as a basis for implementing the present invention is described in UK Patent No. 2440699 to Polymer Logistics BV (NL).

For conciseness of the description, the present invention will be described primarily in the context of various implementations of a dolly. It should be noted, however, that all features of the invention may be implemented in an analogous manner for a pallet or a dolly-pallet unless it is either self-evident or explicitly stated to the contrary.

Unlike conventional dollies and pallets, the devices of the present invention provide one or more load-bearing surface that is vertically displaceable relative to the ground. The term "base structure" is used herein to refer to the parts of the device typically below or level with the lowest position of the load-bearing surface which do not move vertically with the load-bearing surface relative to the ground. The base structure may include a horizontal deck similar to a conventional dolly surface over which the load-bearing surface of the present invention is deployed. Alternatively, the base structure may be implemented as an open frame. The phrase "load-bearing surface" is used herein to refer to any surface or combination of surfaces that together provide a load-supporting surface of the device. The surface may be slatted or may have ventilation openings or other openings, all as is known in the art. The load-bearing surface typically extends either over substantially the entire surface area of the dolly or over a significant fraction of the area, most typically a half. In some cases, the load-bearing surface is a dedicated shelf of the device upon which—materials or a stack of containers may be directly loaded. In other cases, the "load-bearing surface" is provided by a separate receptacle (e.g., a crate or beverage tray) which cooperates with other elements of the device to form an overall system according to the teachings of the present invention.

In certain cases, receptacles (e.g., crates or trays) to be used with the system of the present invention are referred to as "modified". Although various different types of modification will be described in the examples below, in general, the term "modified" in this context refers to a receptacle having a shape as viewed from above in which at least one region within a generally rectangular outline is rendered unavailable for use due to an opening or recess formed to accommodate at least part of a support structure according to the present invention.

The term "footprint" refers to a generally rectangular shaped, usable area of the load-bearing surface. Minor areas departing from the general rectangular shape are not considered part of the footprint for the purposes of this document.

Finally with regard to definitions, "elastic suspension elements" refer to elements that provide a resilient restoring force without undergoing significant permanent deformation during each cycle of motion. Thus the "elastic suspension elements" of the present invention may be implemented using a length of an elastomeric material, a helical spring or any other stretchable element with suitable properties. Most preferably, the suspension elements are formed, primarily or exclusively, from an elastomeric material, such as natural or synthetic rubber. Elastomeric suspension elements are not generally susceptible to damage through bending during folding of the suspension support structures, which may in certain circumstances be problematic for helical metallic springs or the like. The "elastic suspension elements" of this invention are preferably configured to operate under conditions of extension rather than under compression.

Turning now to the Figures, as shown in FIGS. 1 and 2A-2D the extended-support embodiment of a dolly with an elastically suspended load-bearing surface includes extended suspension support elements 1, a base structure 2 for providing structural support to the suspension support structures 1, ledge supports 3 for supporting a container or shelf (see FIGS. 6 & 7), slot guides 4 for defining a vertical direction of motion for the ledge supports 3, container hooks 5 for engaging a container or shelf (see FIGS. 6 & 7), elastic suspension elements 6 for providing load-responsive vertical motion, suspension element channel 7 for protecting the elastic suspension elements 6 and adding stability to the ledge supports 3 as they move vertically, vertical partitions 8 for preventing adjacent loads from snagging on each other, suspension connection pegs 9 for connecting the elastic suspension elements 6 to the support structures 1, stabilizing pegs 10 for stabilizing the ledge supports 3, lock assemblies 11 for holding the support structures 1 in an upright position, wheels 12 for providing mobility for a dolly, ledge peg 13 for attachment to the elastic suspension elements 6, corner guards 14 for preventing loaded materials from snagging on items in the surrounding vicinity, and hook groove 15 for enabling the folding of the elongated support structures 1 into a substantially horizontal folded position.

The suspension support structures 1 include shaped portion forming a vertical channel in the outer surface wherein the channel walls and the floor form a corresponding protruding surface on the inside of the suspension support structures 1. A vertical groove is disposed along the center of the channel along with a parallel vertical alignment slot 4 on each side of the channel 7. This arrangement is repeated in the opposing suspension support structure 1.

Each support ledge 3 includes a recess complementary to the above mentioned protruding surface wherein a rigidly-fastened, protruding ledge peg 13 is disposed in the recessed surface and similarly a protruding alignment peg 10, is disposed on each side of the ledge peg 13 so that each of the pegs are in alignment with the corresponding vertical slots guides 4 of the suspension support structures 1.

Each ledge support 3 is disposed in the suspension support structures 1 so that the alignment pegs 10 engage the corresponding slot guides 4, the recessed face interfaces with the corresponding protruding surface and the ledge peg 13 passes through the channel slot (not shown).

A suspension connection peg 9 is rigidly attached to the suspension support structure 1 near the top of suspension structure channel 7. A first terminal portion of an elastic suspension structure 6 is attached to the connection peg 9 and a second terminal portion of the elastic suspension element is attached to the ledge peg 13. An identical arrangement support ledge 3 is repeated for the opposing suspension support structure so that each set of opposing support ledges 3 configured in this manner produces a load-responsive load-bearing surface. The non-limiting variant of FIG. 1 depicts two sets of support ledges configured accordingly so as to provide a duality of load-responsive shelves.

Figure 6:
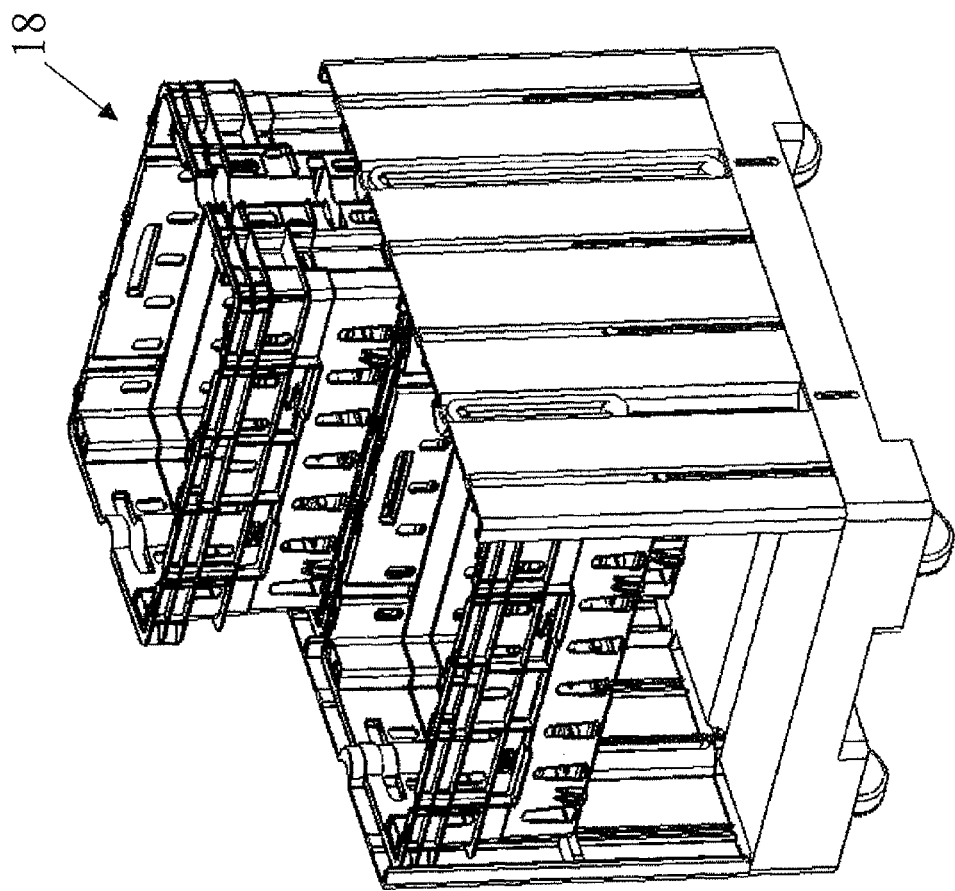
FIG. 6 is an isometric view of the dolly of FIG. 1 with its elastically suspended load-bearing surfaces loaded with adapted stackable containers.
Figure 7:
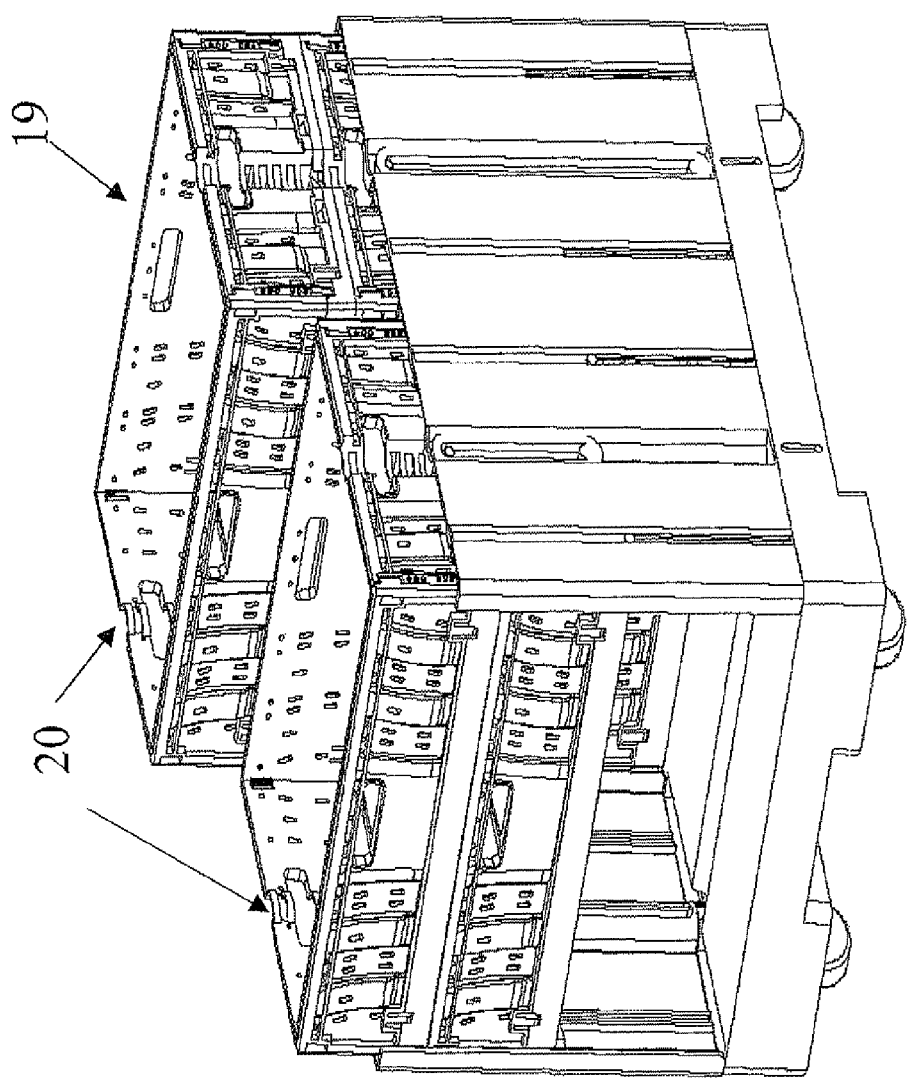
FIG. 7 is an isometric view of the dolly of FIG. 1 with its elastically suspended load-bearing surfaces loaded with adapted foldable containers.

As a user loads the dolly the elastically suspended shelf moves downwards and as a user unloads the dolly the weight reduction will enable the load-bearing shelf to move upwards as shown in FIGS. 6 and 7.

This two-shelf variant provides a provision to diminish the likelihood of a load catching on a neighboring load. Frequently the corners of materials loaded on a load-bearing surface protrude outside the boundaries of the shelf. In situations in which either one or both of the neighboring loads are in motion there is a possibility that a load will catch on the neighboring load thereby preventing the shelf from continuing its path of motion. Such complications can lead to merchandise sliding off a tilted shelf or in worse case scenario causing a safety risk when a shelf is unable to continue its upward path of direction. The bias applied by the elastic suspension elements can cause the shelf and its contents to suddenly pop up when the snag is freed causing injury to an unsuspecting individual bent over the dolly. To address this problem the present invention includes a vertical partition 6 disposed between the two load-bearing surfaces. The partition 6 prevents the corners of materials loaded on either of the shelves from protruding into the line of travel of the neighboring load thereby greatly reducing the possibility of such complications. The present invention includes a similar provision for preventing the same problem in regards to neighboring dollies, or other items that may be in the vicinity. A corner guard 14 is disposed on each corner of the dolly so as to prevent the corners of the load to project outside the boundaries of the load-bearing shelf.

The present invention includes a suspension support structures 1 configured to fold into a folded position as shown in FIGS. 3A-5B. In the extended support structure embodiment the support structures are foldably mounted on the base structure and held into an upright position by a locking arrangement 10. The current embodiment advantageously provides for the folding of the suspension support structures 1 without disconnecting the elastic suspension elements 1 from the support structures 1 and without lowering the load bearing surface as required in other embodiments as will be discussed. The support ledge 3 and the associated container hook 5 are sufficiently non-protruding to enable the folding of the suspension support structures 1 without interfering with the freedom of rotational motion needed to assume a folded position. An additional folding feature illustrated in the current embodiment is the overlap feature of the folded suspension structures 1 as most clearly shown in FIGS. 5A and 5B. The advantage of such functionality is that such a folding arrangement affords the highly desirable quality of compactness needed to maximize the efficiency of transport when transporting unloaded dollies or pallets. Such functionality is accomplished by disposing the hinges on which the suspension support structures 1 pivot into a folded position, at different heights so that the support structure pivoting on hinges 17, disposed at a lower height, folds into a folded position and the support structure 1 pivoting on the hinges 16 disposed at a greater height, folds into an overlapping position. Most preferably, the structure of hinges 16 and 17 may be implemented as similar hinges configured to provide vertical freedom of motion when folding so that the support structures 1 can be folded in an arbitrary sequence.

Figure 8B:
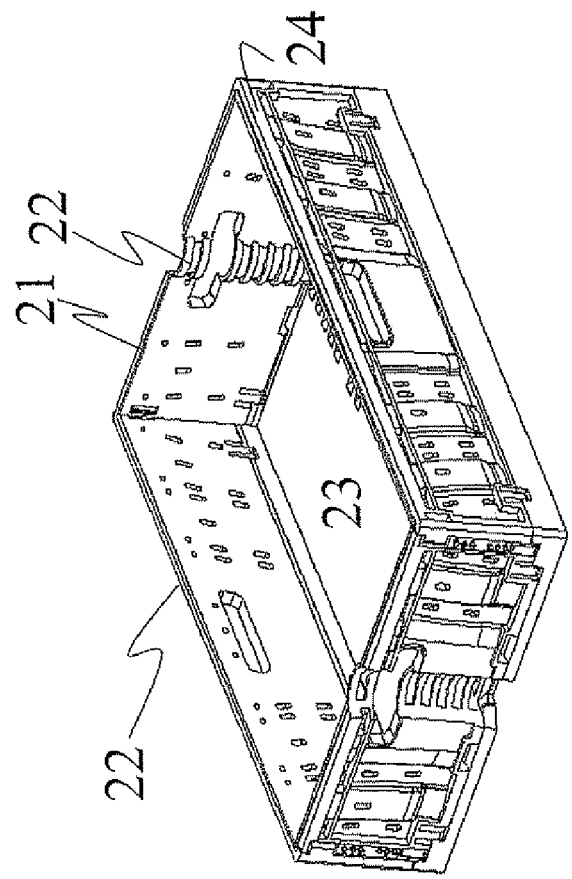
FIGS. 8A and 8B are isometric views of the adapted foldable container of FIG. 7 in its folded and erected states, respectively.
Figure 8A:
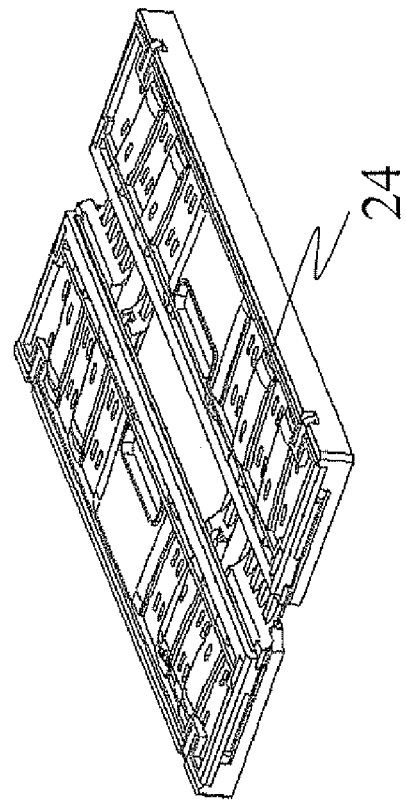
Figure 9B:
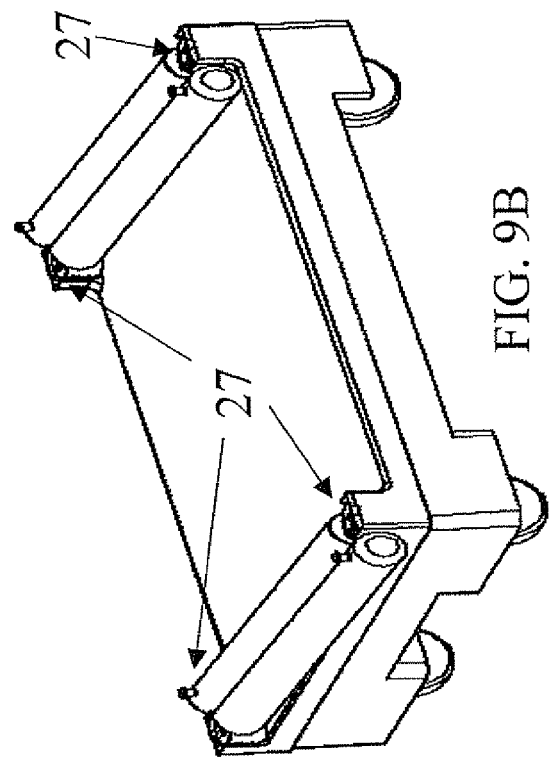
FIGS. 9A and 9B are isometric views of second embodiment of a dolly, constructed and operative according to the teachings of the present invention, having support structures inset within the outline of the elastically suspended load-bearing surface, the dolly being shown in its erected and folded states, respectively.
Figure 9A:
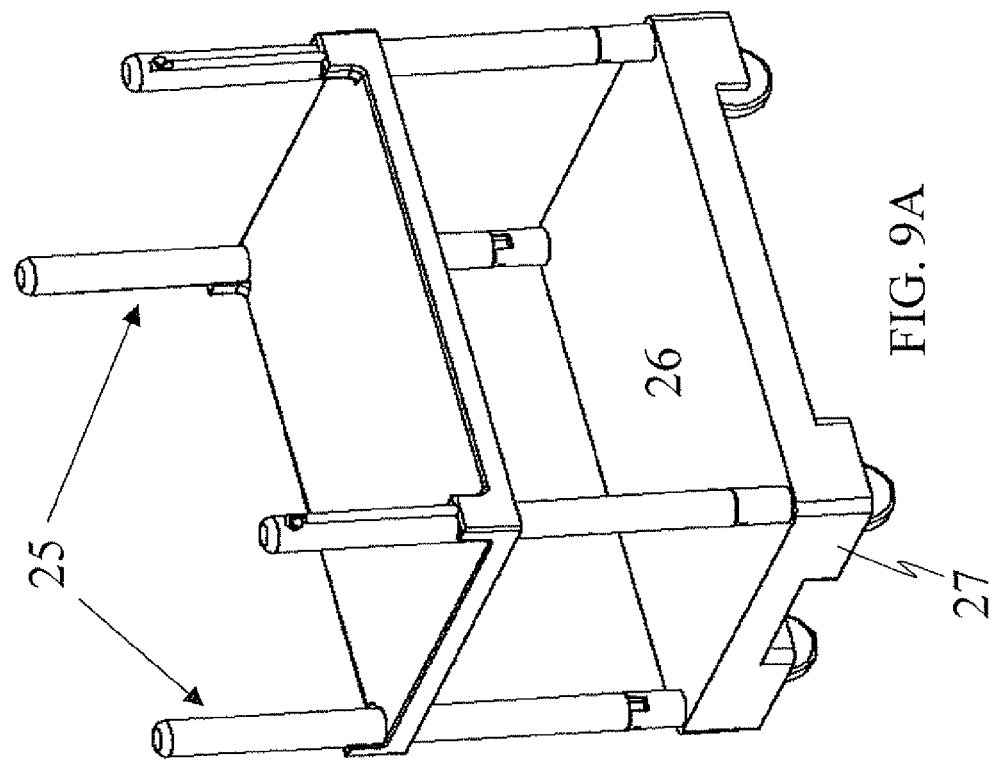
Figure 10A:
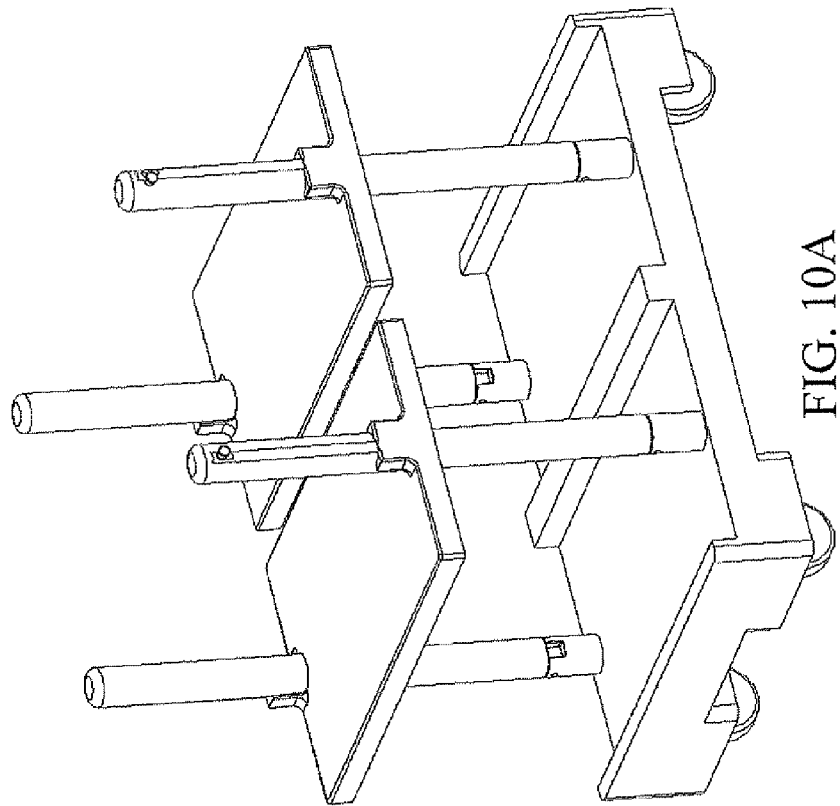
FIGS. 10A and 10B are isometric views of a two-shelf variant of the dolly of FIGS. 9A and 9B, again shown in its erected and folded states, respectively.
Figure 10B:
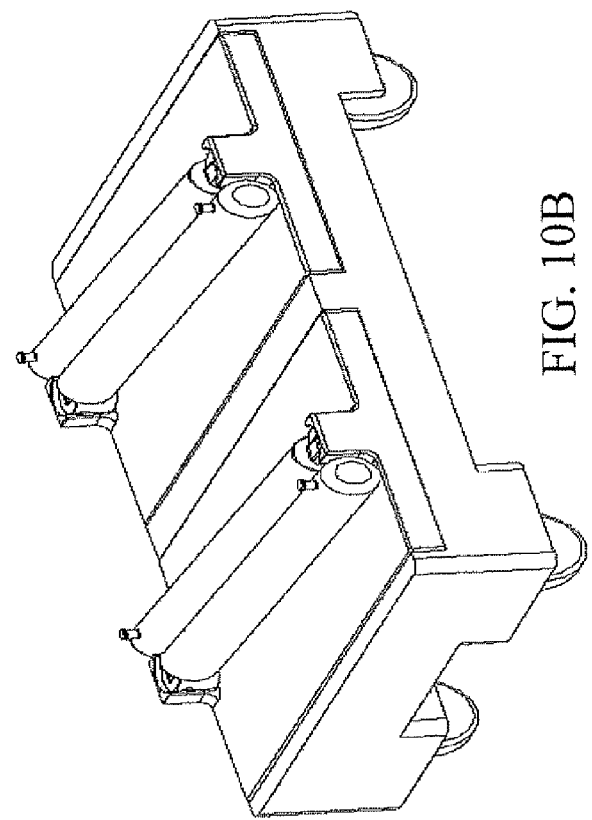

FIG. 6 illustrates a two-shelf capacity variant loaded with stacking containers 18. Dollies used with such containers are fitted with ledge supports protruding sufficiently to provide support the reduced-width stacking trays FIG. 7 illustrates the same embodiment loaded with folding containers 19 adapted to fit into the dolly. FIG. 8 illustrates the adapted end wall that includes a recess 20 corresponding to the protruding surface of the elastic channel 7 suspension support structures 1. In order to enable the end walls 21 of the folding container to fold flat against the floor the recessed portion 20 of the end walls 21 is formed from a series of horizontal, equally spaced strips 22 disposed such that the strips mesh with corresponding spaces disposed in the floor 23 when the end walls 21 are folded downwards into a folded position. This adaptation enables the end walls 21 to fold flush against the floor 23 thereby enabling the sidewalls 24 to fold into a compact folded position overlaying the end walls 18.

Figure 11:
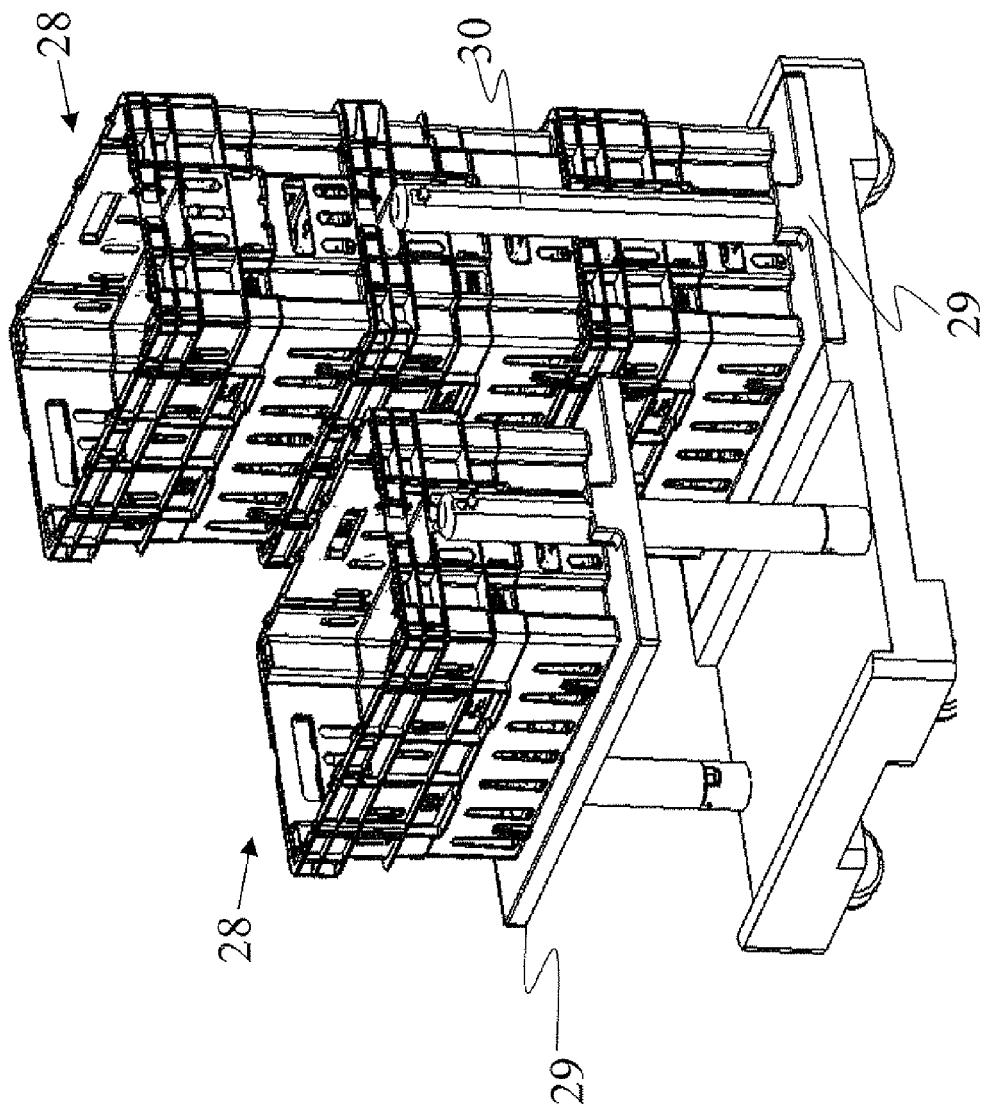
FIG. 11 is an isometric view of the dolly of FIG. 10A loaded with stackable containers.

FIGS. 9A through 10B illustrate internal support embodiments in which the suspension support columns 25 are disposed inside the footprint 26 that thereby enabling the placement of dollies next to each so that the surrounding outer surfaces 27 are flush with each other. FIG. 9B illustrates a folding feature of the present invention enabling the suspension support structures 25 to fold into a folded position without interfering with the line of motion of the opposing support structure as it folds into a folding position. This feature ensures the dolly maintains a compact folded position to facilitate the return transport of empty dollies. This functionality is accomplished by disposing each hinge axis 28 at an angle such that when each of the support structures 25 folds along a a line of motion not interfering with the line of motion of the opposing support structure 25, or alternatively by employing opposing pivotally mounted hinges that swivel so that lines of motion of each folding structure does not intersect. Alternatively the suspension support columns 25 are disposed so that they do not oppose each other. FIG. 11 illustrate the functionality of the dual load variant in its partial and fully loaded states. As mentioned above, as the load 28 on the shelf 29 increases the elastic suspension elements 30 extend into their extended state and as the load 28 the associated shelf 29 moves towards its elevated default position.

Figure 12:
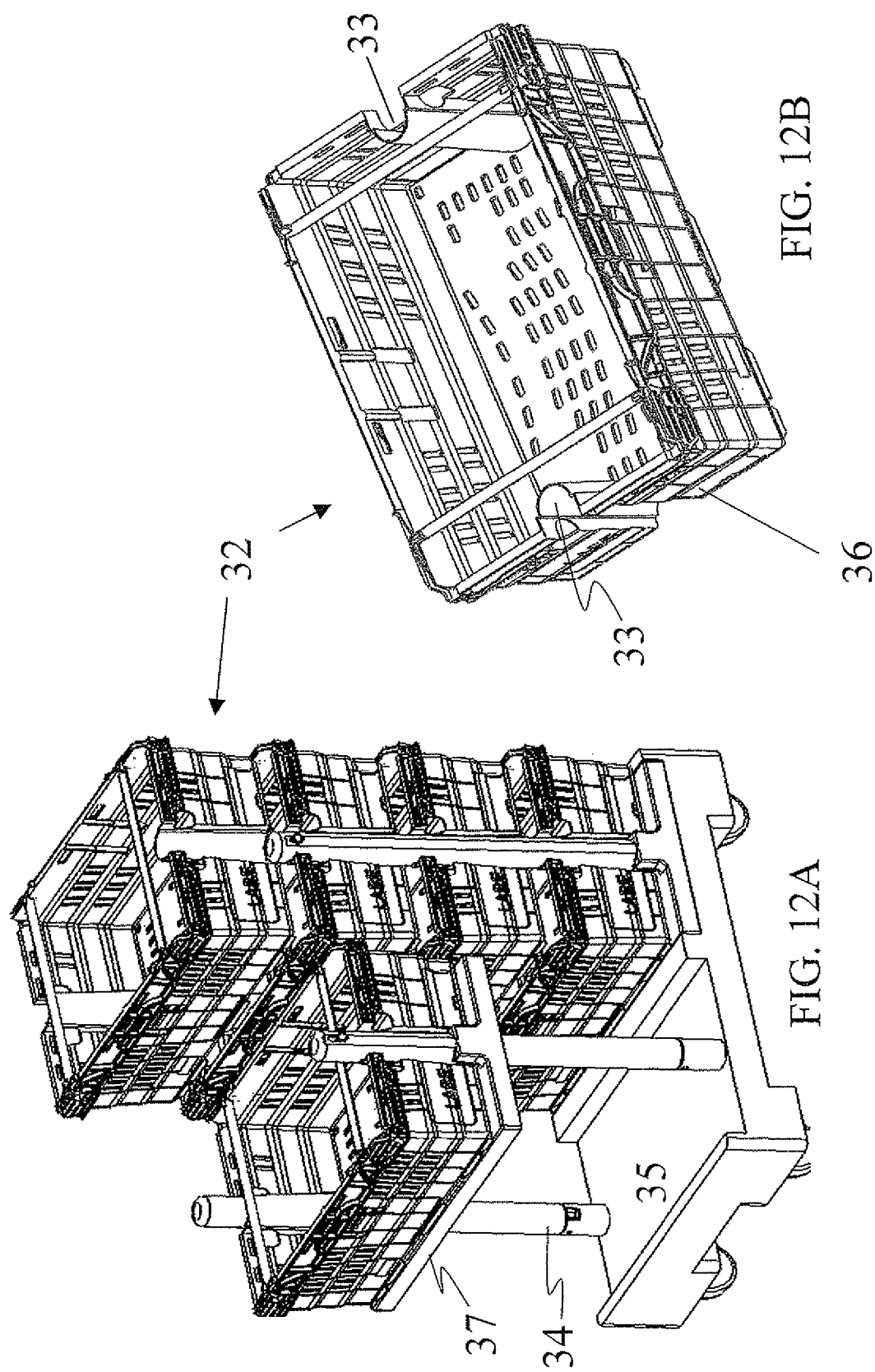
FIG. 12A is an isometric view of the dolly of FIG. 10A loaded with adapted bale-arm containers.
FIG. 12B is an isometric view of the adapted bale-arm container from FIG. 12A.

FIGS. 12A and 12B illustrate an additional feature of the present invention manifest particularly in the internal support embodiment. The suspension support structures 34 disposed inside the footprint 35 reduce the usable load-bearing surface. The present invention includes dedicated containers 32 configured to maximize the usable load-bearing surface by forming into the end walls 36 a recess 33 complementary to the suspension support structures 34. Such a configuration enables a more efficient usage of the shelf surface. 37.

Figure 13:
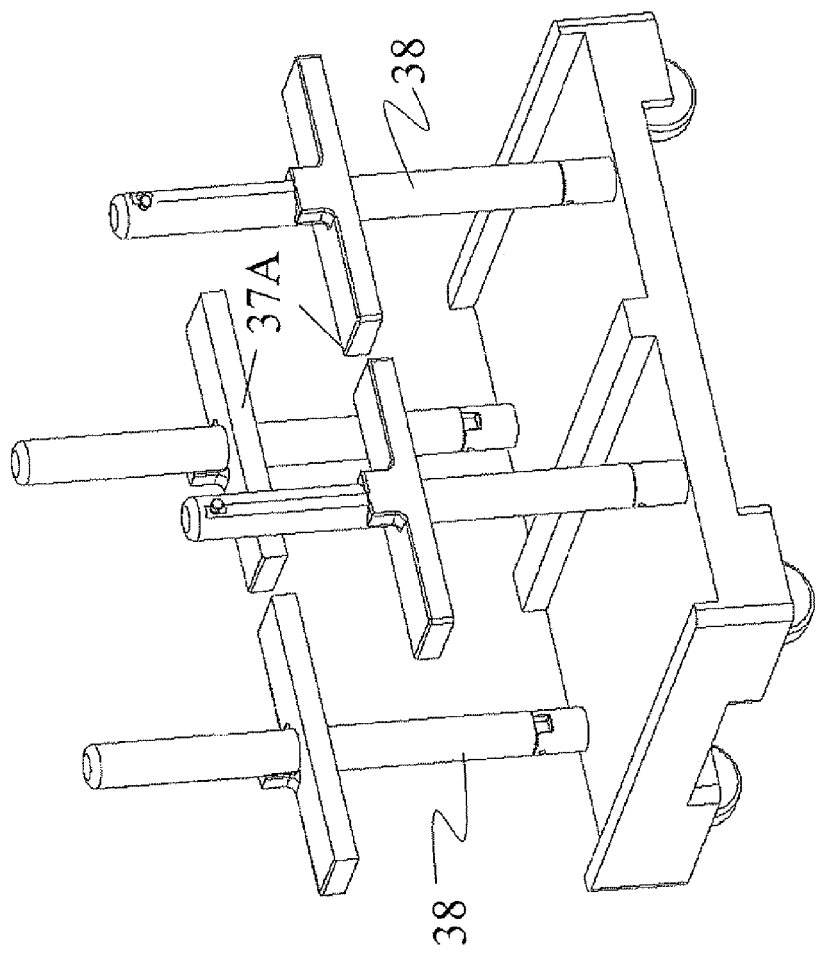
FIG. 13 is an isometric view of a variant embodiment of the dolly of FIG. 10A in which the load-bearing shelves are reduced to support ledges, and the primary load-bearing surfaces are provided by the lowermost container of a stack of containers to be used with the dolly.

FIG. 13 illustrates another feature of the present invention manifest in a ledge support 37A form of the inner support embodiment. As mentioned above, load-bearing surfaces implemented as ledge supports 37A advantageously enable the folding of the suspension support structures 38 while the load-bearing surface remains in its upper position.

FIGS. 14A through 15B illustrate systems including the dolly with its elastically suspended load-bearing surface together with dedicated containers with end walls adapted to match the shape of the suspension support structures. In the case of FIG. 14B, the "container" is a shaped tray with a two-dimensional array of holders, i.e., configurations, in this case recesses, for receiving individual items to be carried on the tray. The case illustrated here is a beverage tray with recessed holders configured for receiving an array of bottles. Most preferably, the underside of the tray is formed with upward recesses to accommodate the tops of an underlying tray of bottles when stacked. The recessed regions at the ends of the tray to accommodate the support structure typically disrupt the array of holders, causing an irregularity in spacing between the holders adjacent to the recessed region.

Figure 15B:
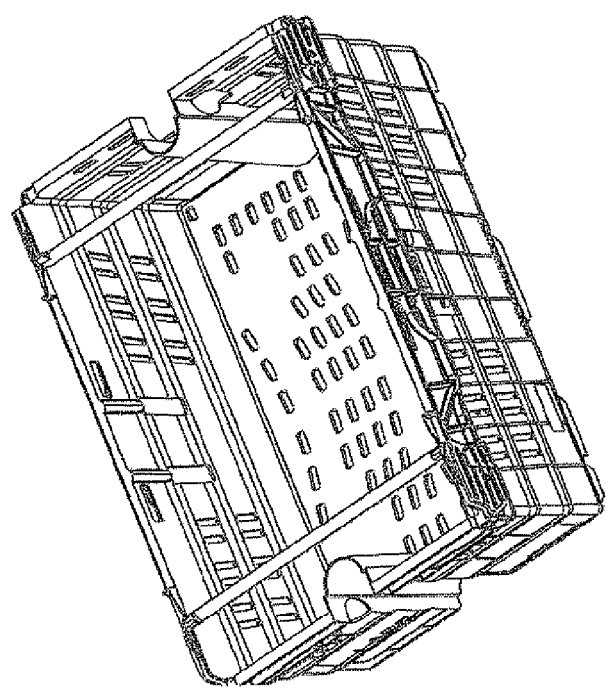
FIG. 15B is an isometric view of an adapted bale-arm container of FIG. 15A.
Figure 15A:
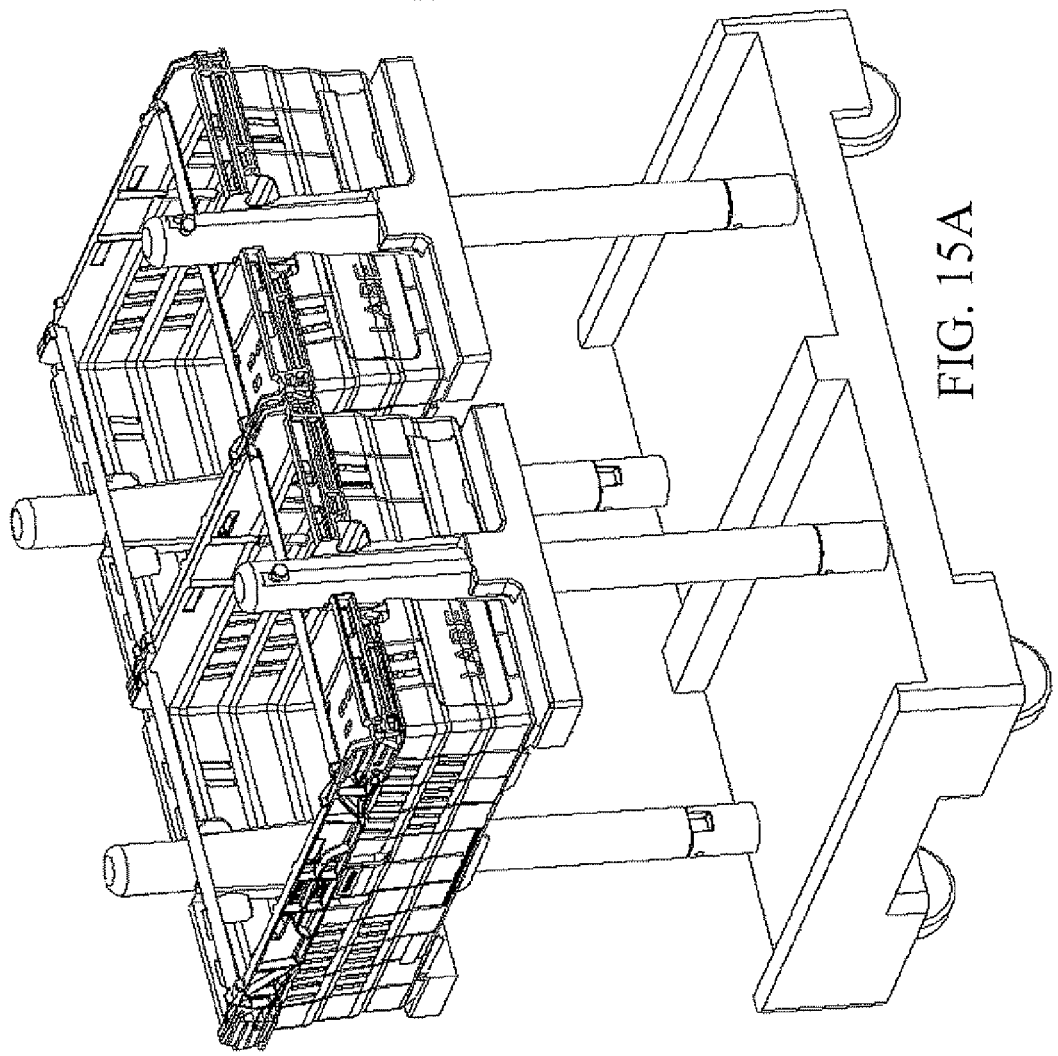
FIG. 15A is an isometric view of the dolly of FIG. 13 loaded with adapted bale-arm containers.

It should be noted that, although the container of FIG. 15B is generally analogous to the container of FIG. 12B, the containers of FIG. 12B are suited for use with a load-bearing shelf 37 and therefore need not be sufficiently strong to support the weight of the load by direct connection to the elastic suspension elements. By contrast, the container of FIG. 15B may need to be relatively more strong.

Figures 16A, 16B, 16C, 16D, 16E:
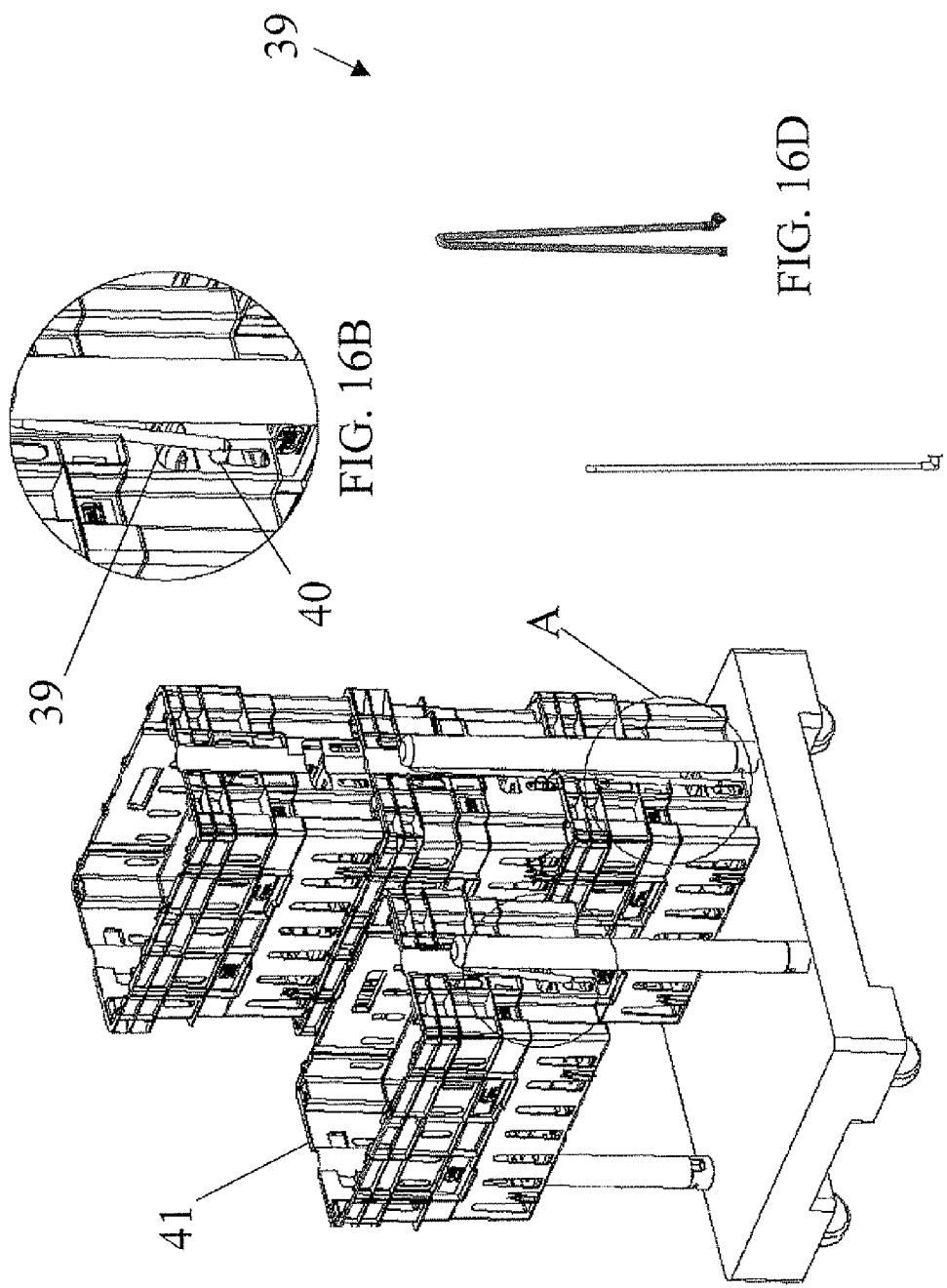
FIG. 16A is an isometric view of a direct suspension embodiment of a dolly, constructed and operative according to the teachings of the present invention, in which a lowermost adapted stackable container is directly suspended via elastic elements from a support structure.
FIG. 16B is an enlarged view of the region of FIG. 16A designated "A".
FIGS. 16C-16E are a side, isometric and front view, respectively, of a doubled elastic element for use in the dolly of FIG. 16A.
Figure 17B:
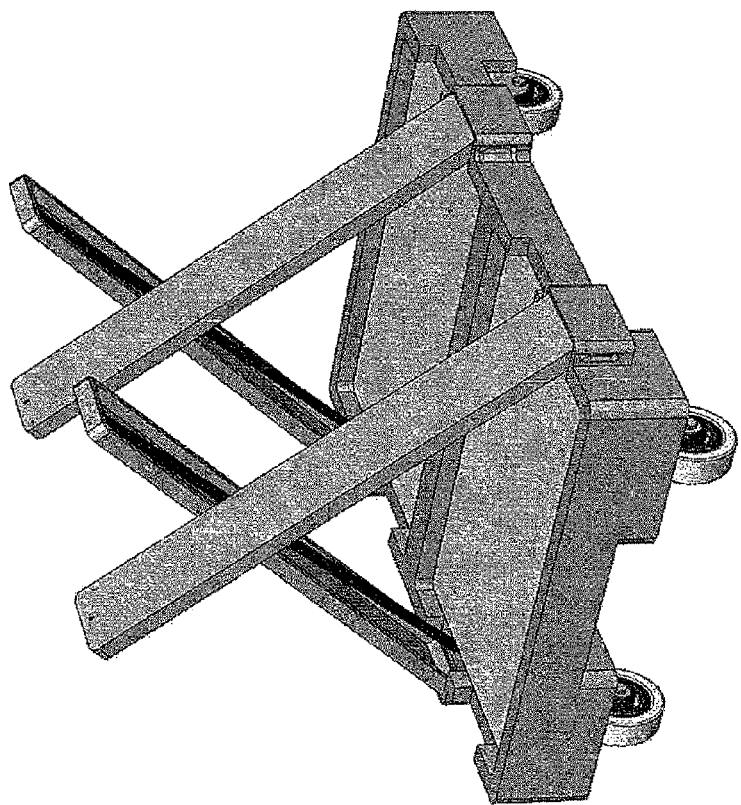
FIGS. 17A, 17B, 18A and 18B are isometric views of an external support embodiment of a dolly, constructed and operative according to the teachings of the present invention, showing uprights of a support structure in a deployed, partially folded, further folded and fully folded state, respectively.
Figure 17A:
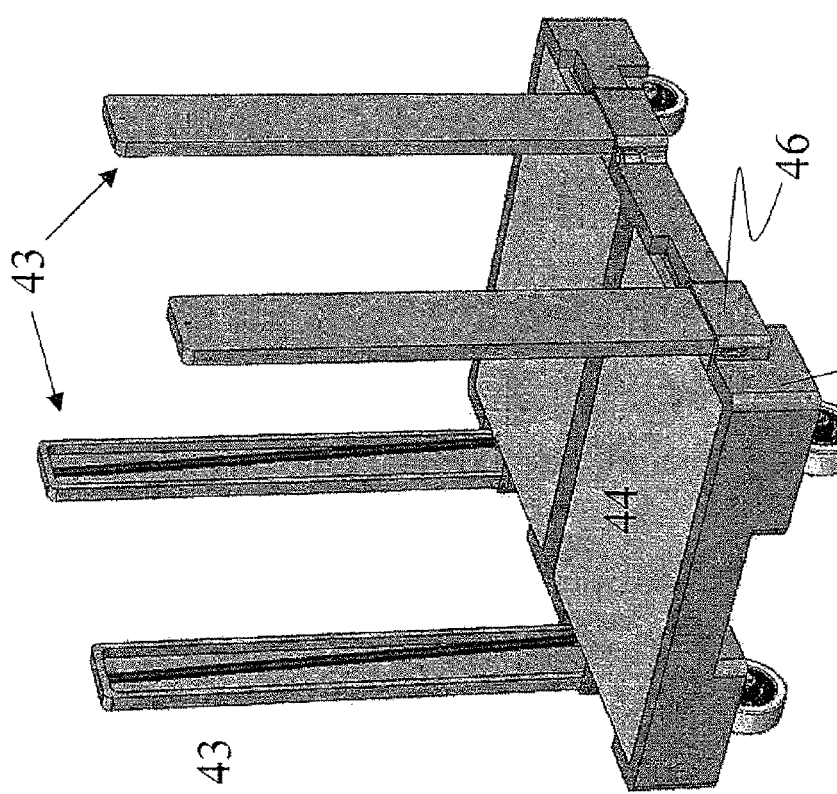
Figures 18A, 18B:
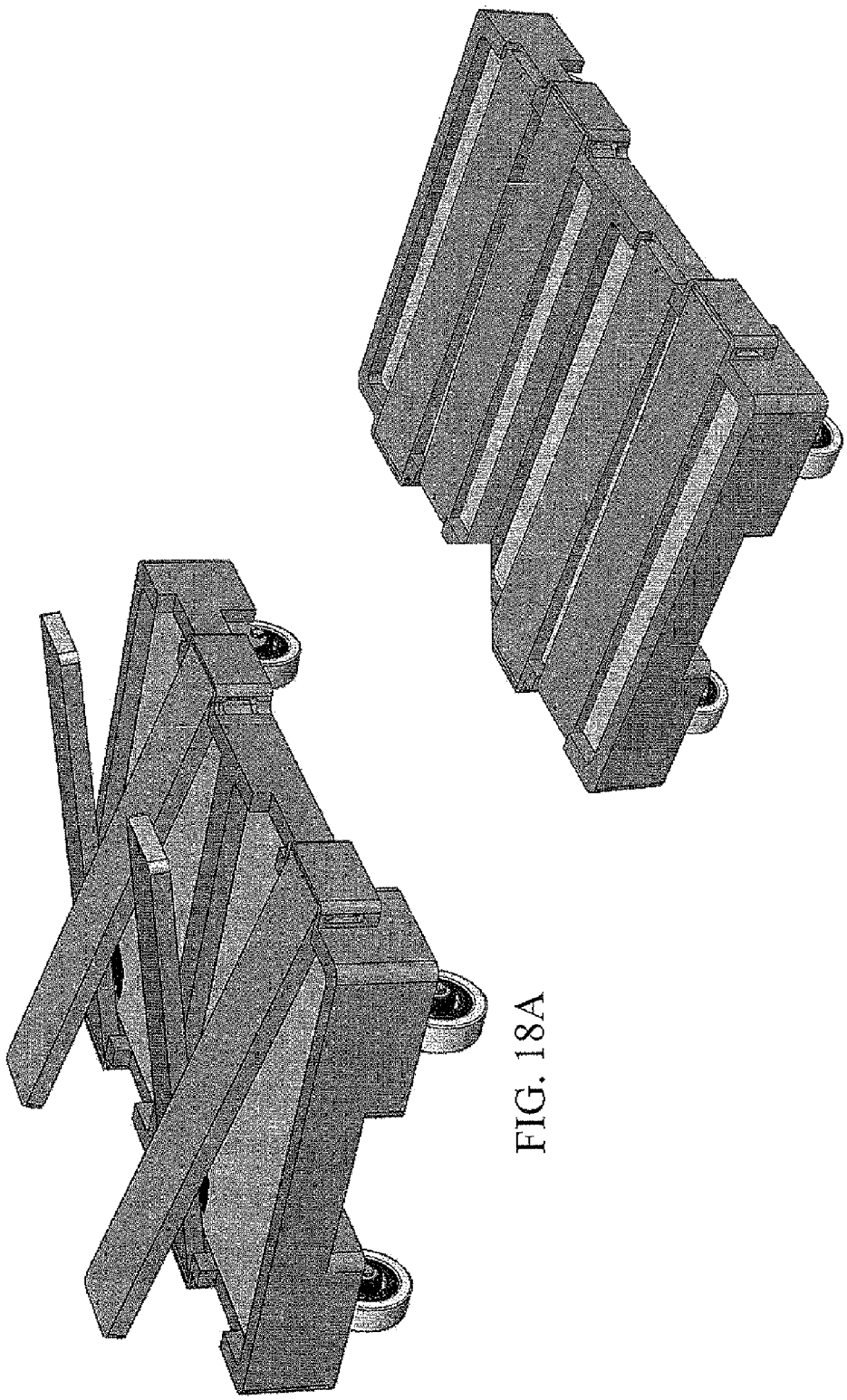

FIGS. 16A and 16A depict a hanging load-bearing surface form of the present invention. The load-bearing surface is implemented as the base or any other supporting surface of the container 41 directly hanging from the elastic suspension elements 39. The hanging container is equipped with a connection arrangement 40 for convenient detachment and attachment of the load-bearing container 41. As mention above, the suspension structures 39 are readily folded into a folded position in order to facilitate storage and return transport.

FIGS. 17A through 18B illustrate an additional feature of the present invention manifested in an external support embodiment. The suspension support structures are pivotably attached to the base structure 45 outside the generally rectangular area defined by the base structure 45. Such an arrangement advantageously preserves a maximum amount of usable load-bearing surface. This has special significance in light of the widespread norm to use standard container sizes for the handling of materials, requiring the entire area of the load-bearing surface of a standard dolly. This functionality is accomplished, in a non-limiting embodiment, via sockets 46 disposed on opposite sides of the base structure 45 at locations in which the line of motion of opposite suspension support structures 43 does not overlap with each other as they pivot into their folded positions as shown in FIGS. 17A-18B.

Figure 19B:
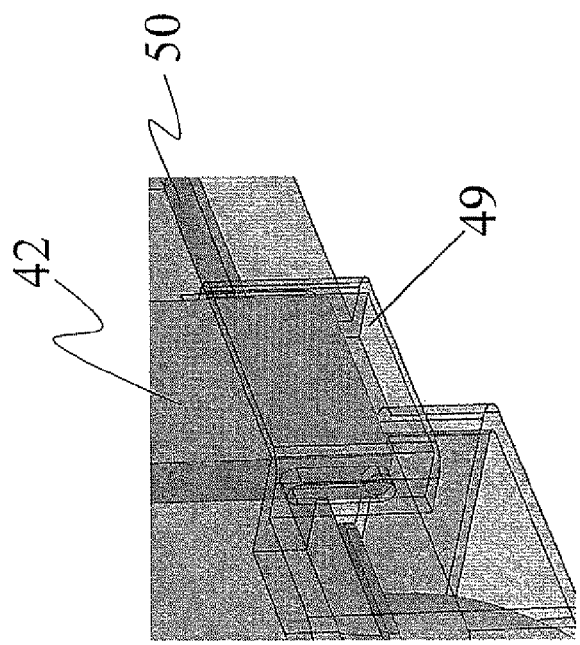
FIGS. 19A and 19B are an isometric view and an isometric-transparent view, respectively, of a region of a hinge arrangement from the dolly of FIG. 17A.
Figure 19A:
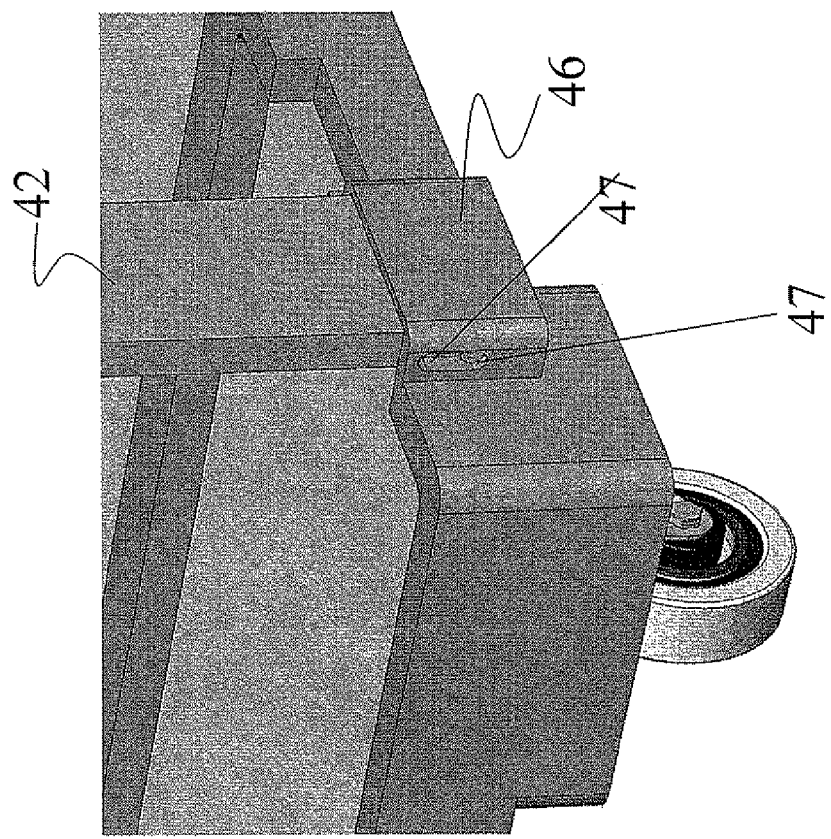

FIGS. 19A and 19B illustrate a suspension support structure 42 disposed in a socket 46 sufficiently deep to be held into an upright position by the outer wall of the socket 49 and the edge of base structure 50 most clearly visible in FIG. 19B. The suspension support structure 42 is disengaged by lifting it upwards to the height defined by a slot 47 enabling the suspension support structure 42 to pivot on a pin 48 into a folded position.

Figure 20B:
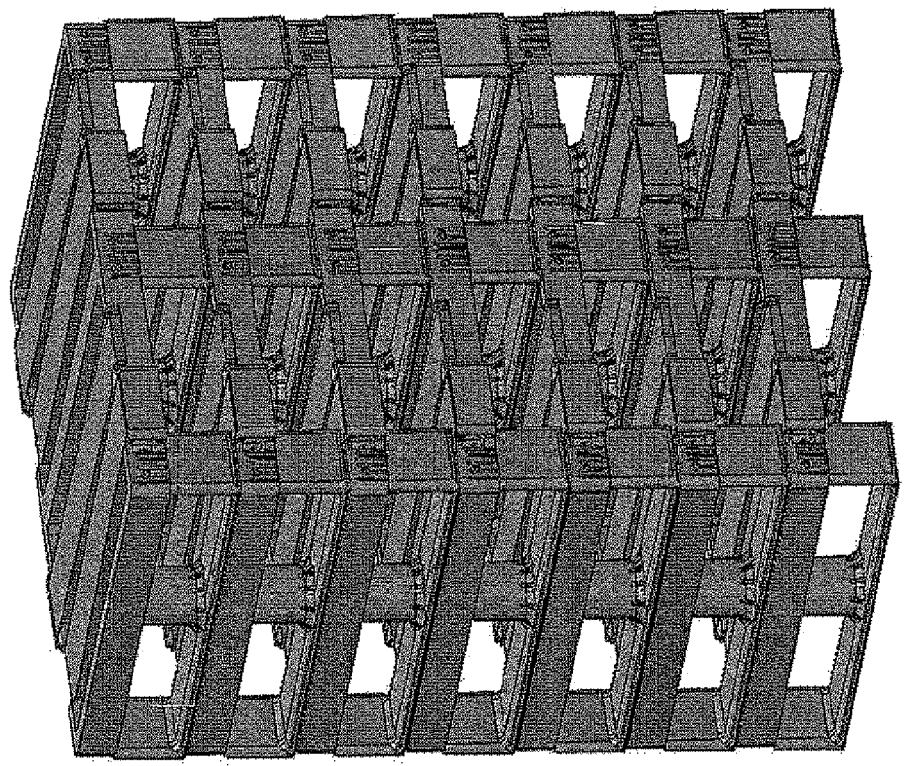
FIG. 20B is an isometric view of a stack of folded pallets of a design otherwise essentially similar to the dolly of FIG. 17A.
Figure 20A:
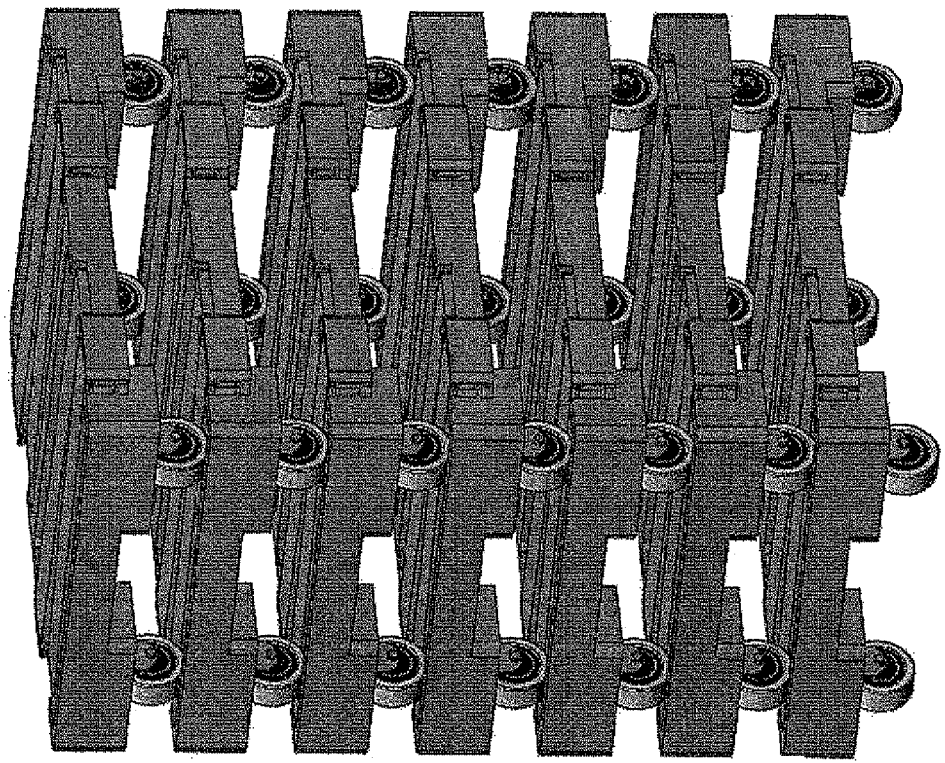
FIG. 20A is an isometric view of a stack of folded dollies like that of FIG. 17A.

FIGS. 20A and 20B highlight the benefit of the folding suspension support feature for both dollies and pallets respectively. This feature provides the ability to compact the dolly and pallet so that it may be conveniently and efficiently stacked for storage and/or transport. Is should be appreciated that this feature applies also to above-mentioned extended suspension support and internal support embodiments as well.

Figure 21C:
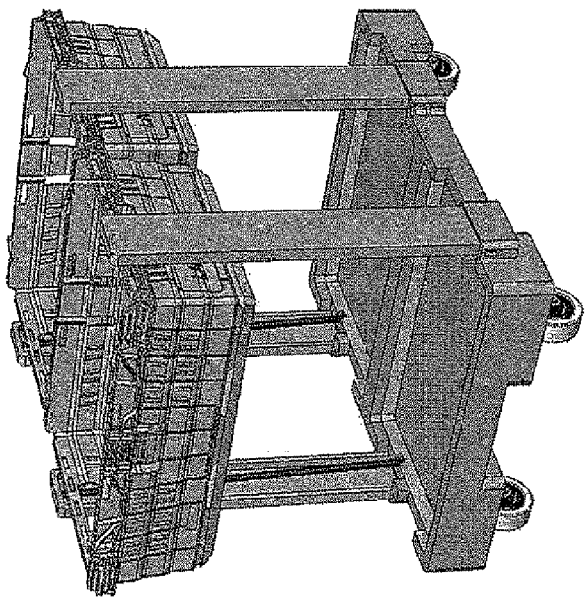
FIGS. 21A-21C are isometric views of the dolly of FIG. 17A fully, partially, and minimally loaded, respectively.
Figure 21B:
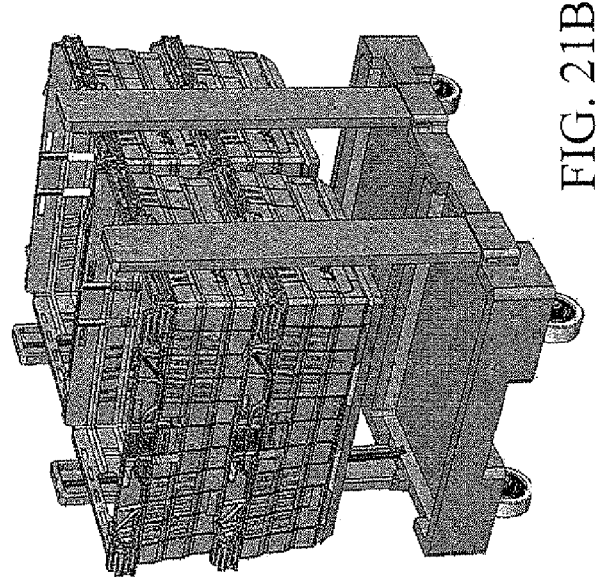
Figure 21A:
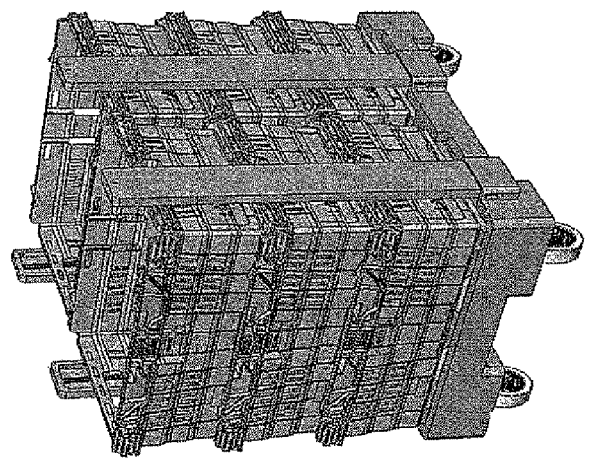

FIGS. 21A through 21C illustrate the functionality of the dolly fully, partially, and minimally loaded. As mentioned above, the elastic suspension elements ensure that the top of the load remains at a substantially constant height.

Figure 22B:
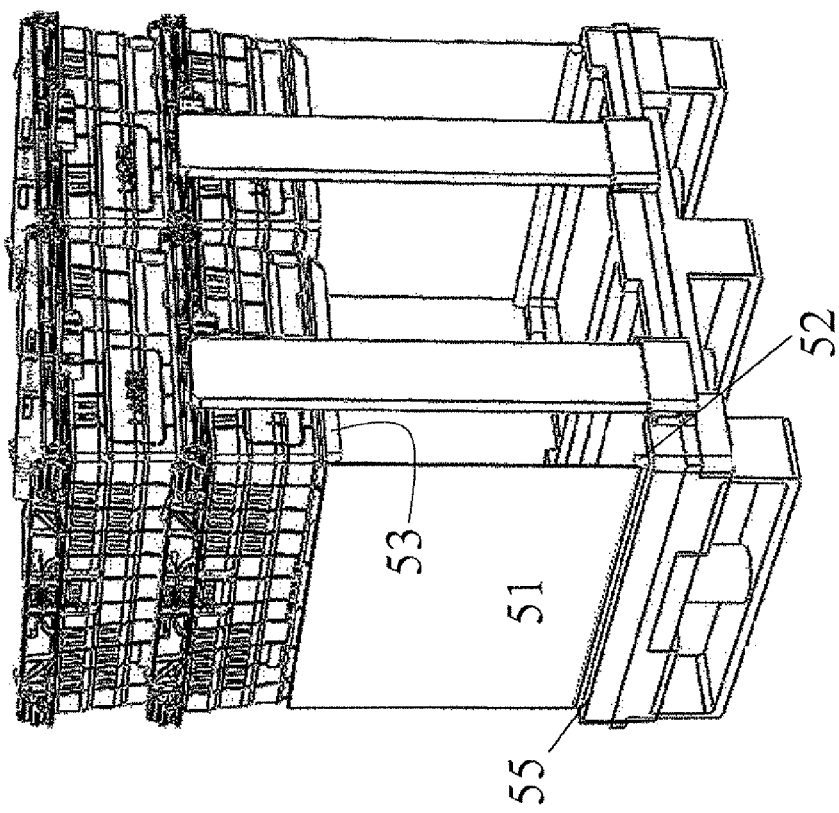
FIGS. 22A and 22B are isometric views of the dolly of FIG. 17A and an analogous pallet, respectively, fitted with roller blinds.
Figure 22A:
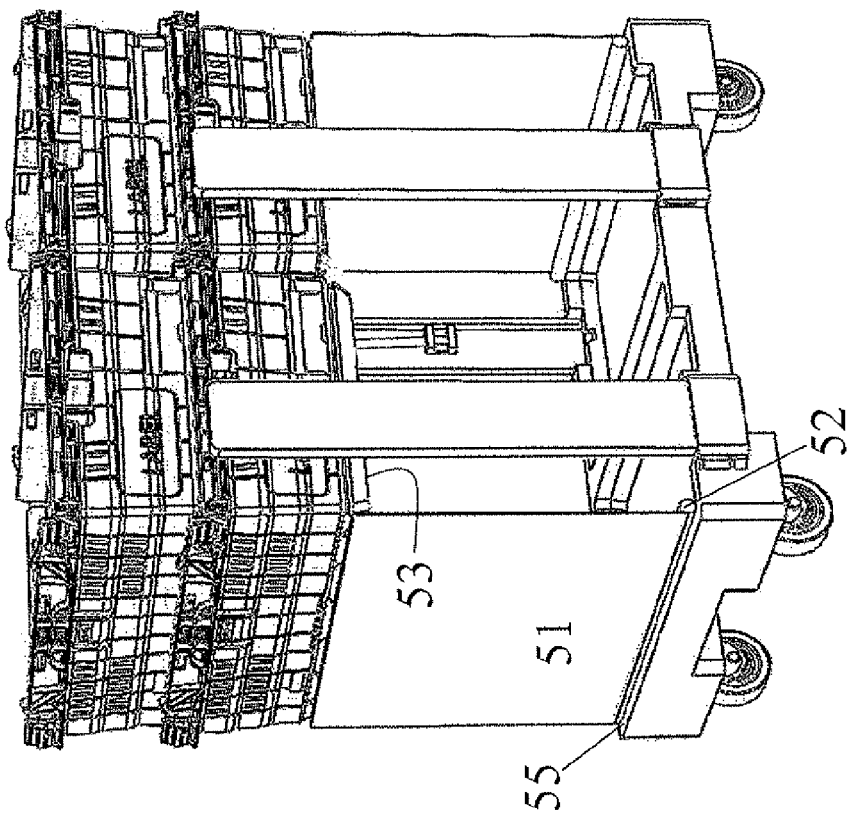

FIGS. 22A and 22B depict dollies and pallets fitted with a provision for modifying their appearance as "behind-the-scenes" equipment to attractive display units appropriate for prospective customers. This functionality is accomplished by means of at least one roller blind unit 55 fixedly attached to the base structure 52 wherein the blind 51 is connected to the vertically displaceable load-bearing surface 53 so that as the load-bearing surface 53 moves upwards the blind 51 unrolls from the roller 52 into an extended position spanning the height between the load-bearing surface 53 and the base structure 54 and conversely, as the load-bearing surface 53 moves downwards, the blind 51 is re-wound onto the roller 52. Preferably the roller 52 is resiliently biased to maintain the blind 51 in a wound position. The blind 51 is made of sheets of cloth, thin sheets of plastic or any other sheeted material capable of being wound onto a roller. It should be noted that the above feature has application also in the extended suspension support and inner support embodiments as well.

Figures 23A, 23B:
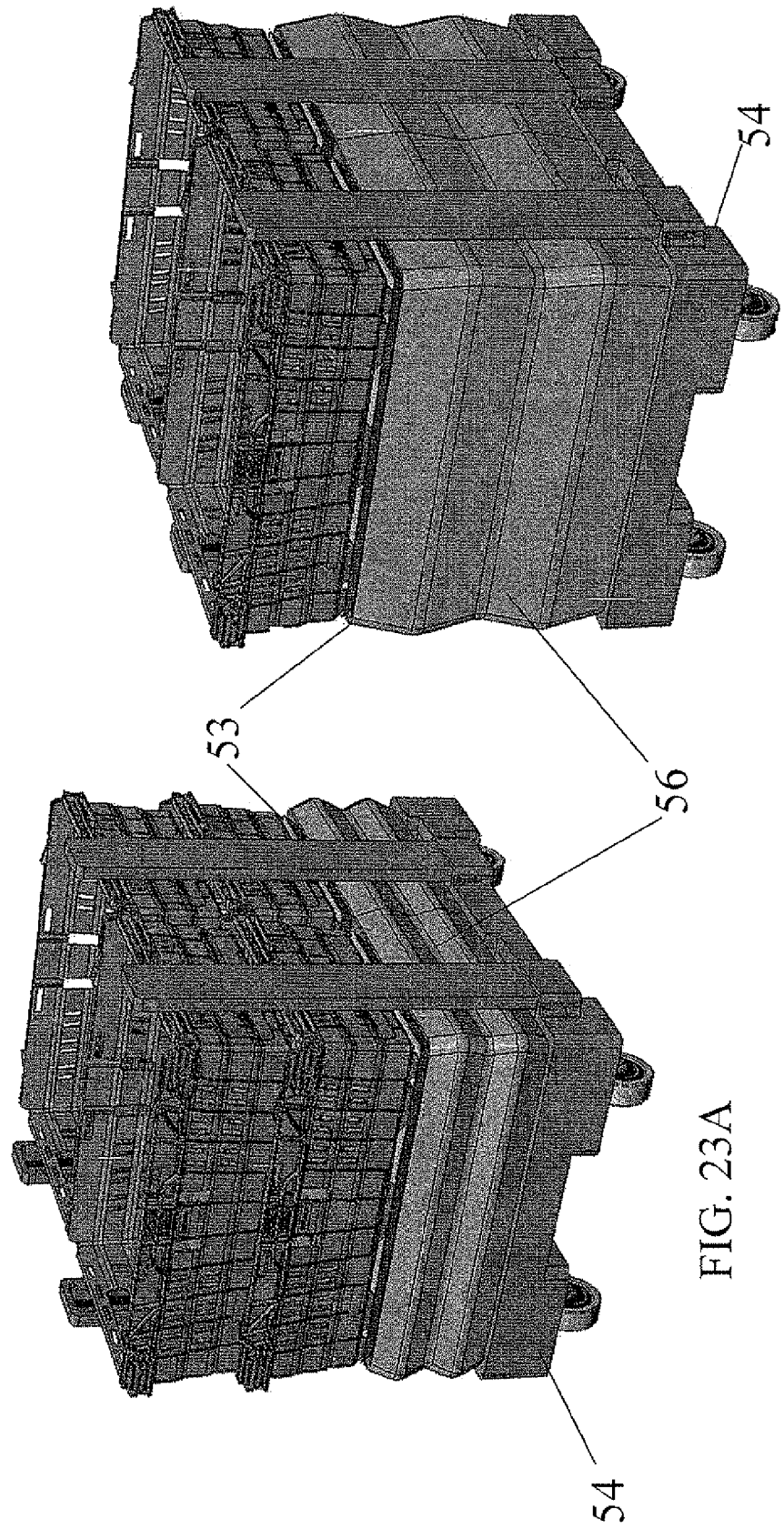
FIGS. 23A and 23B are isometric views of the dolly of FIG. 17A fitted with an accordion-like skirt and shown in a lowered and raised state, respectively.

FIGS. 23A and 23B illustrate an alternative implementation of the above-mentioned appearance modifying provision via a series of panels connected pivotably lengthwise and disposed along at least one side of the base structure 54 so that the collective panel 56 widths span the height between the base structure 54 and the load-bearing surface 53. The bottom edge of the bottom panel 56 connects to the base structure 54 and the top edge of the top panel 56 connects to the load-bearing surface 53 so that as loads-bearing surface moves upwards the panels 56 unfold into an extended surface spanning the height between the base structure 54 and the load-bearing surface 53 and when the load-bearing surface 53 moved downwards the panels 56 fold into a partially folded position spanning the reduced height between the base structure 54 and the load-bearing surface 53. The panels are preferably constructed from sheets of colored plastic, or any other stiff sheeted material providing such functionality. Is should be appreciated that this feature applies also to above-mentioned extended suspension support and internal support embodiments as well.

Figure 24:
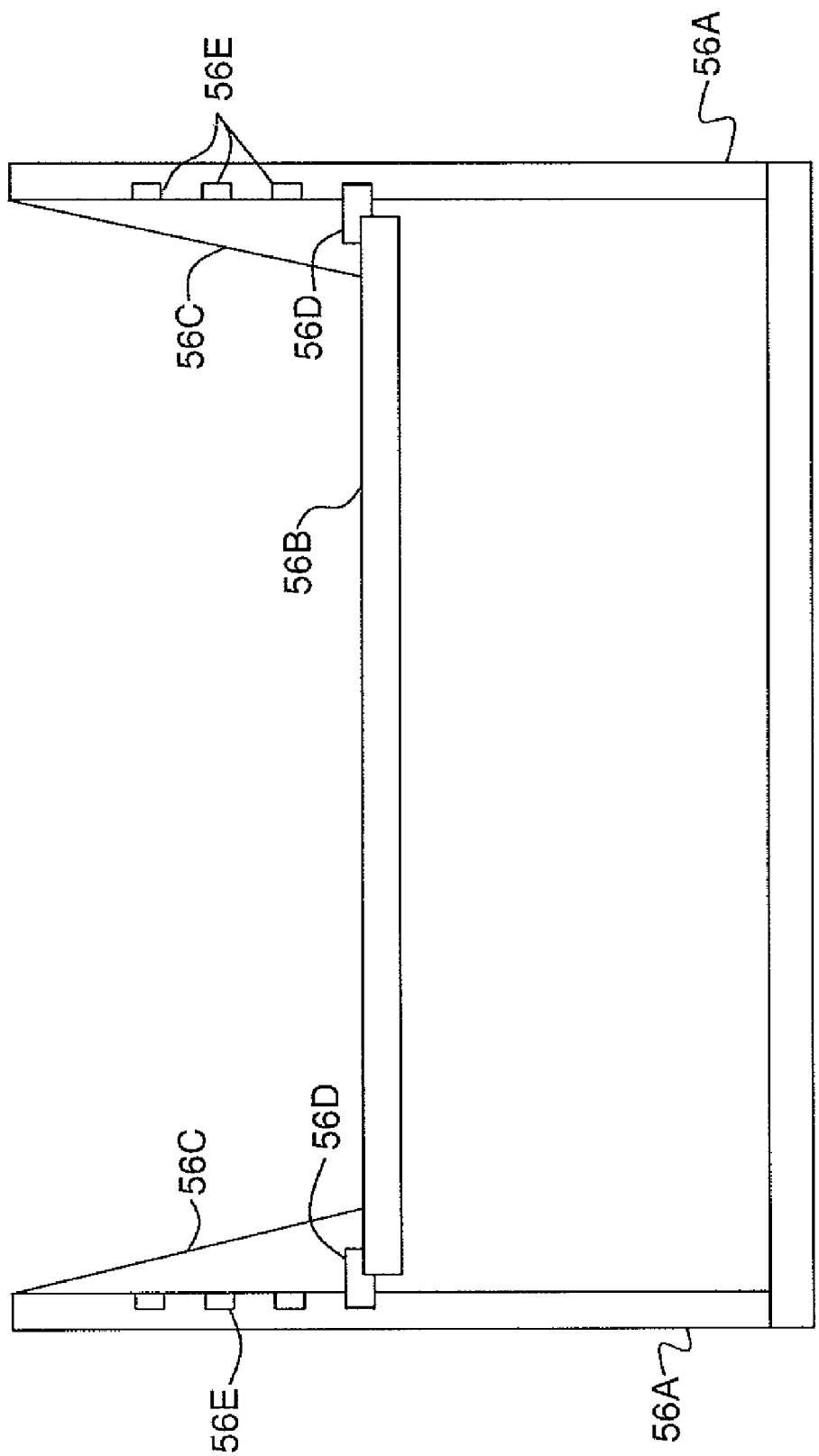
FIG. 24 is a schematic end view of an optional feature according to which a stopper block arrangement selectively connected to the suspension support structures defines an uppermost raised position.
Figure 25B:
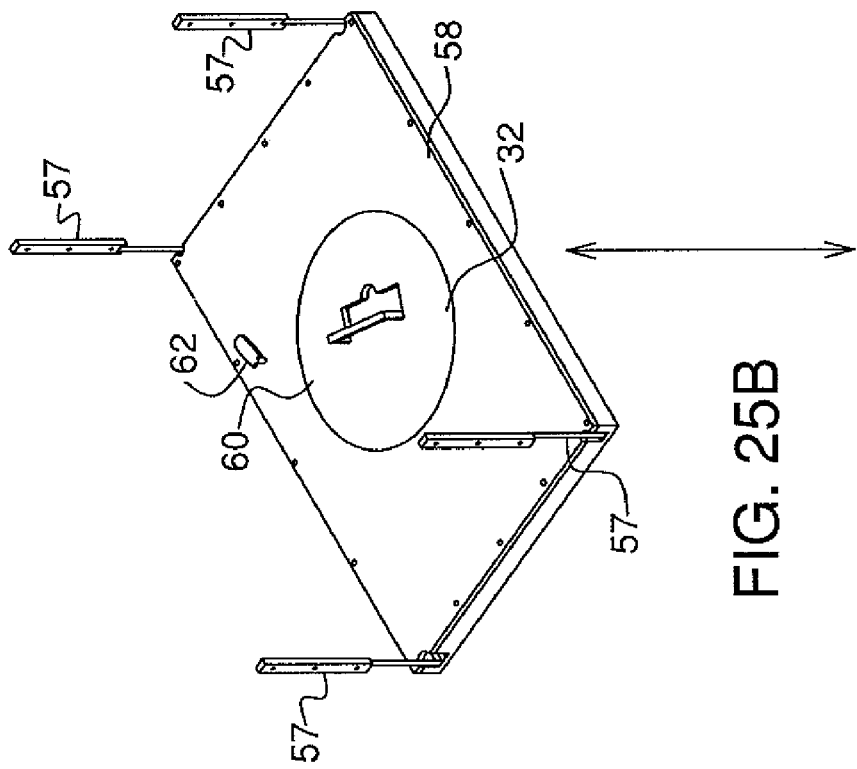
FIGS. 25A and 25B are isometric views of a variant of the dolly of FIG. 9A with an upper surface of the shelf removed to reveal a rotary adjustment mechanism for simultaneously adjusting the effective lengths of a plurality of elastic suspension elements shown in the lowered state and the raised elastically-suspended state, respectively.
Figure 25A:
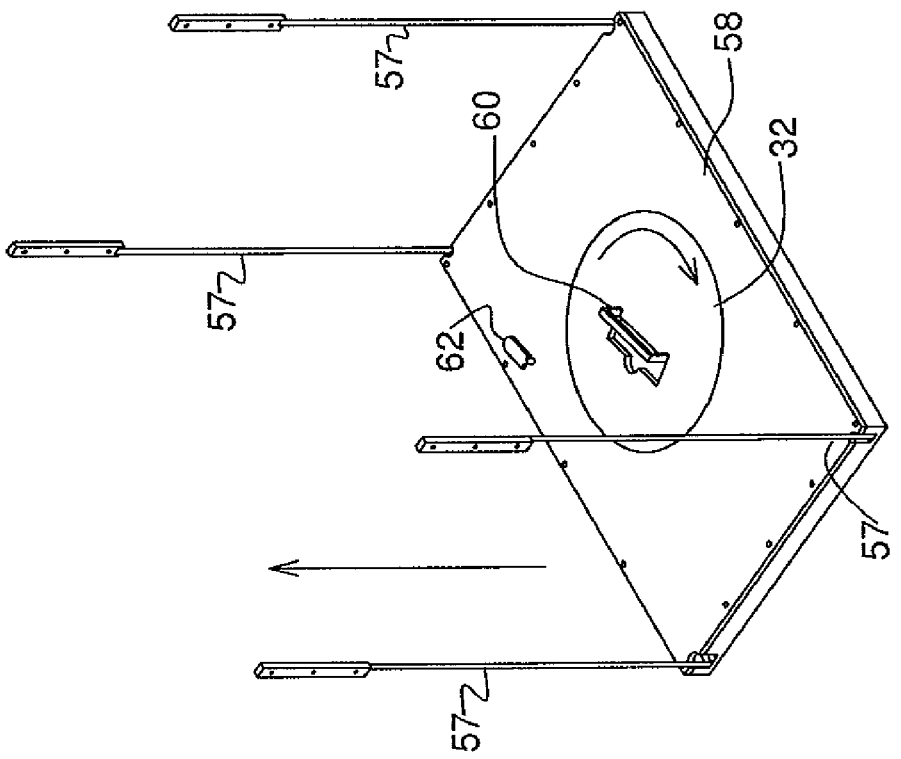
Figure 26B:
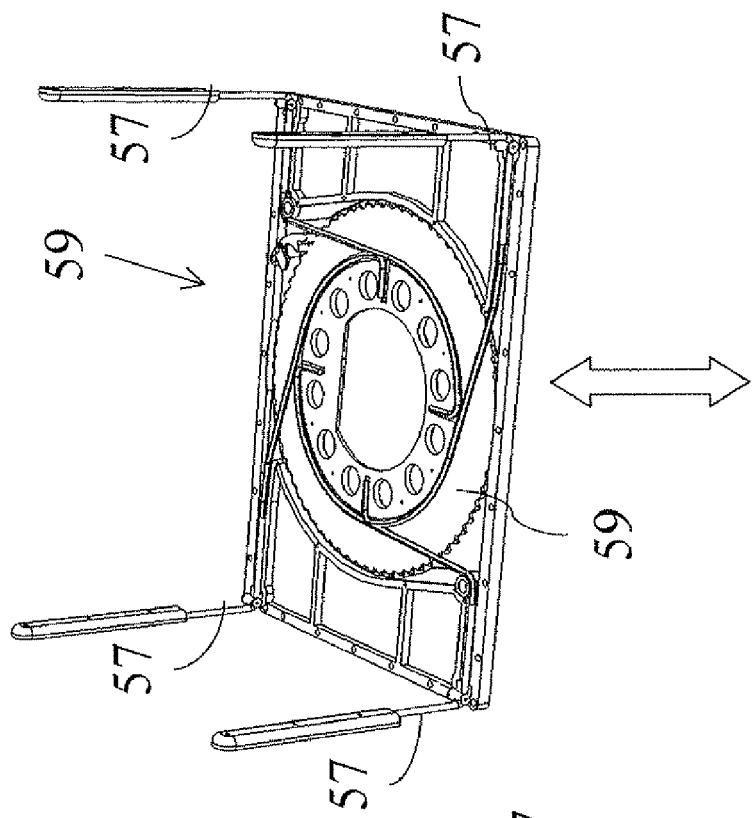
FIGS. 26A and 26B are isometric views of the rotary adjustment mechanism of FIGS. 25A and 25B cut-away to show details of an adjustment mechanism for adjusting an effective length of said elastic suspension elements.
Figure 26A:
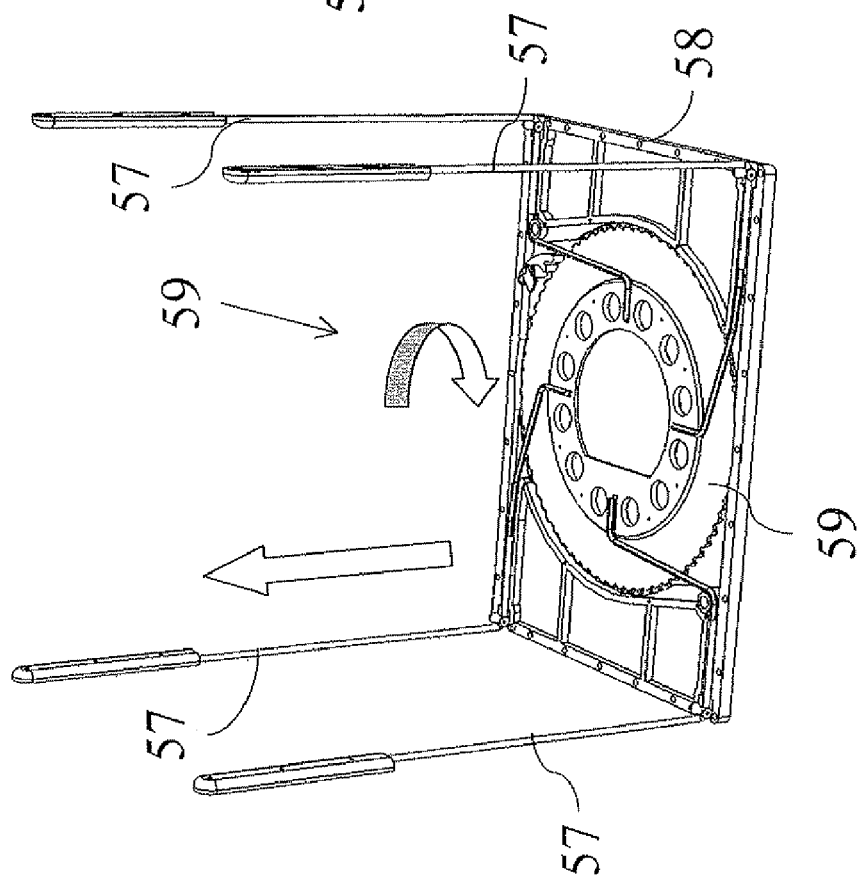

FIG. 24 illustrates an optional feature according to which stoppers 56d are selectively attached to the suspension support structures 56a so as to define an uppermost height of the load-bearing surface 56b. This selectivity is provided by a series of stopper connections 56e disposed at matching heights on each of the suspension support structures 56a The stopper blocks 56d in conjunction with a rotary adjustment mechanism, to be discussed, enable the adjustment of the pretension the elastic suspension element 56c apply to the load-bearing surface 56b. Consequently, the dolly equipped with a single set of elastic suspension elements 56c can accommodate heavy loads requiring high pretension and lighter loads requiring low pretension. FIGS. 25A-27C illustrate preferred feature of the present invention for adjusting the effective length of the suspension elements 57. Typically, the "effective length" of the suspension elements is the length from a point of attachment to the suspension support structure to the point of entry to load-bearing surface 58. Preferably, the suspension-element length adjustment mechanism is manually operable (directly by hand, or by use of a mechanical "key"), and preferably simultaneously adjusts the length of all of the suspension elements in a similar manner.

The provision of a suspension-element length adjustment mechanism serves one or both of two important functions. One function is to allow adjustment of the lifting force to make the mechanism useful for produce of different weights. Thus, for bricks or cinder blocks, the suspension elements are shortened more to provide a greater lifting force than for less dense, or less densely packed, materials. As a result, the same dolly can be used to maintain a comfortable constant level for dispensing a wide range of materials.

The second function is the release of tension in the suspension elements prior to folding of the suspension support elements for return shipping or storage, thereby ensuring that there are no potentially dangerous or inconvenient stresses or a tendency to open.

Prior to loading with materials, the effective length of the suspension elements is adjusted (shortened) so as to define a level of tension for the fully loaded state and/or the position of the fully raised state. Mechanical stopper features may be provided to separately define a fully-raised position.

Turning now to the features of this embodiment in more detail, the adjustment mechanism is based on a drum or wheel 59, deployed primarily below or within floor load-bearing surface, to which suspension elements 57 are anchored. Rotation of wheel 59, for example by turning a handle 60 accessible from the upper side of load-bearing surface 58, causes winding in of suspension elements 57 simultaneously from the state of FIG. 26A to that of FIG. 26B, thereby shortening their effective length and/or pre-tensioning them against stopper elements. In the example shown here, the suspension elements 57 wind onto a reduced diameter spool surface which is located between upper and lower disks, the upper disk having been removed in FIGS. 26A and 26B for clarity of presentation. The handle may be recessed into the floor, or may be a removable "key" used by authorized personnel only. Optionally, a locking mechanism may be operated automatically by folding down of the handle or removal of the key.

Figure 27B:
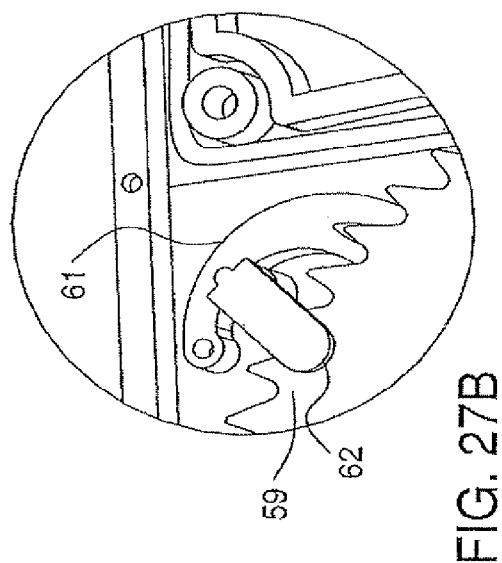
FIGS. 27B, and 27C are enlarged views of the region of FIG. 27A designated "A" showing a ratchet arrangement in an operative and an overridden state, respectively.
Figure 27C:
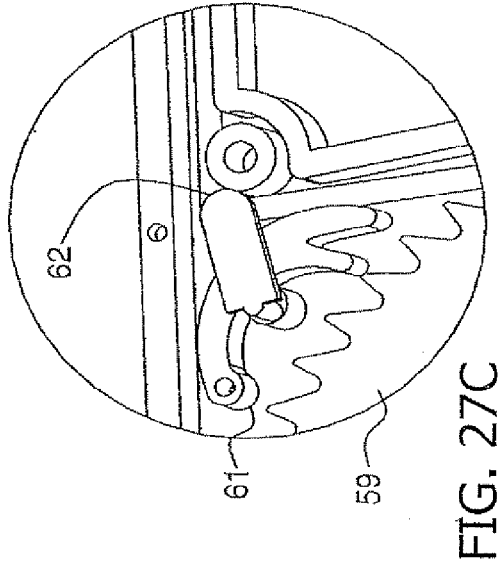
Figure 27A:
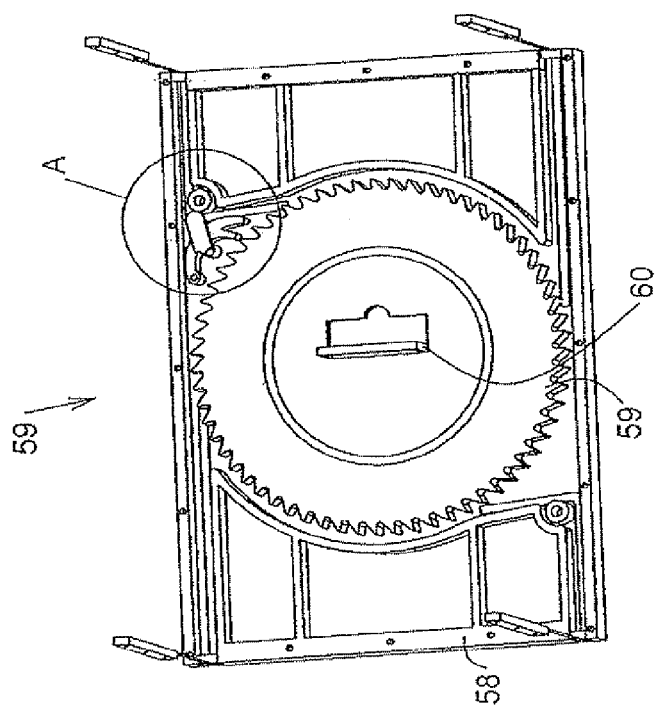
FIG. 27A is a view similar to FIG. 26B with an upper surface of the shelf removed.

Once a desired length or degree of tension is achieved, the wheel is locked against rotation, for example, by insertion of one or more locking pin through holes formed in the wheel and the load-bearing surface 58, or more preferably by a ratchet mechanism such as illustrated in FIGS. 27B and 27C below.

Referring specifically to FIG. 27B, drum 59 is here formed with an outer edge formed as a saw-toothed gear wheel against which a spring-biased ratchet arm 61 bears. This configuration allows rotation of the drum clockwise as shown to shorten an effective length of elastic suspension elements 57, but inhibits rotation of the drum 59 in the reverse direction, preventing lengthening of the elastic suspension elements 57. This conveniently allows shortening of the suspension elements 57 to raise the load-bearing surface 58 and/or pre-tension it against stopper features, then maintaining the desired level of tension during loading and unloading of materials. When the load has been removed, lowering of the load-bearing surface 58 is performed by turning a release lever 62 with an eccentric cam form which bears on ratchet arm 61, disengaging it from the teeth of drum 59 so as to override the ratchet arrangement and allow rotation of the drum to lengthen an effective length of the elastic suspension elements to an inoperative length, allowing load-bearing surface 58 to assume the position of FIG. 25A ready for folding of the suspension support structures and return transportation.

Figure 29:
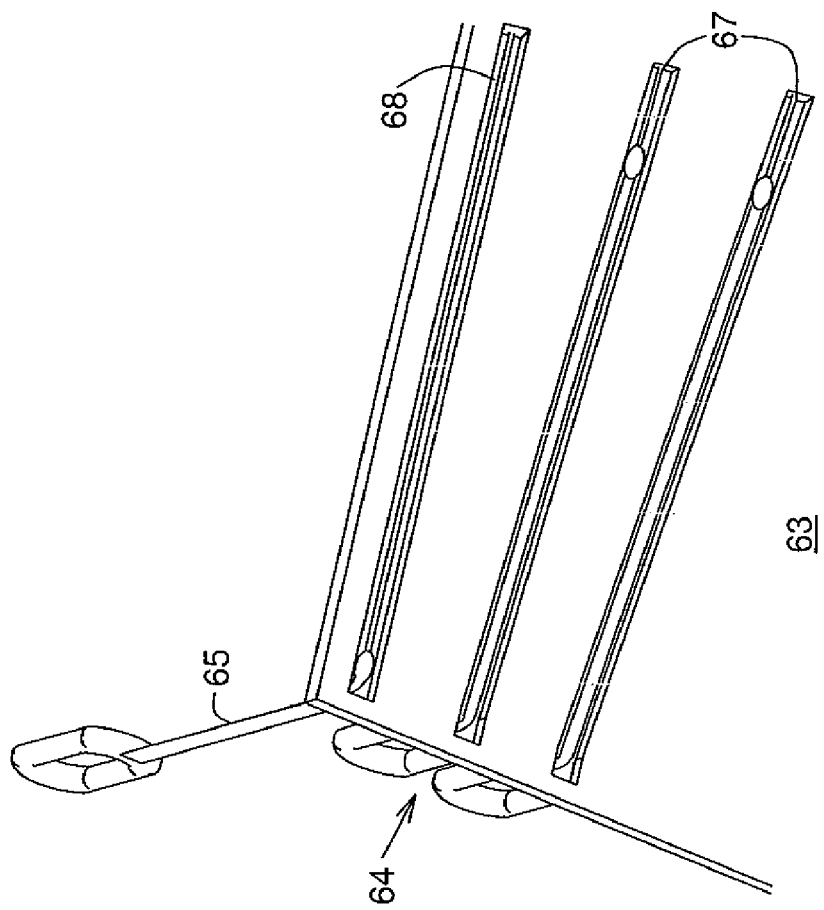
FIGS. 28 and 29 are schematic partial top and bottom isometric views, respectively, of a shelf provided with redundant elastic suspension elements with one suspension element shown deployed and two suspension elements retracted.
Figure 28:
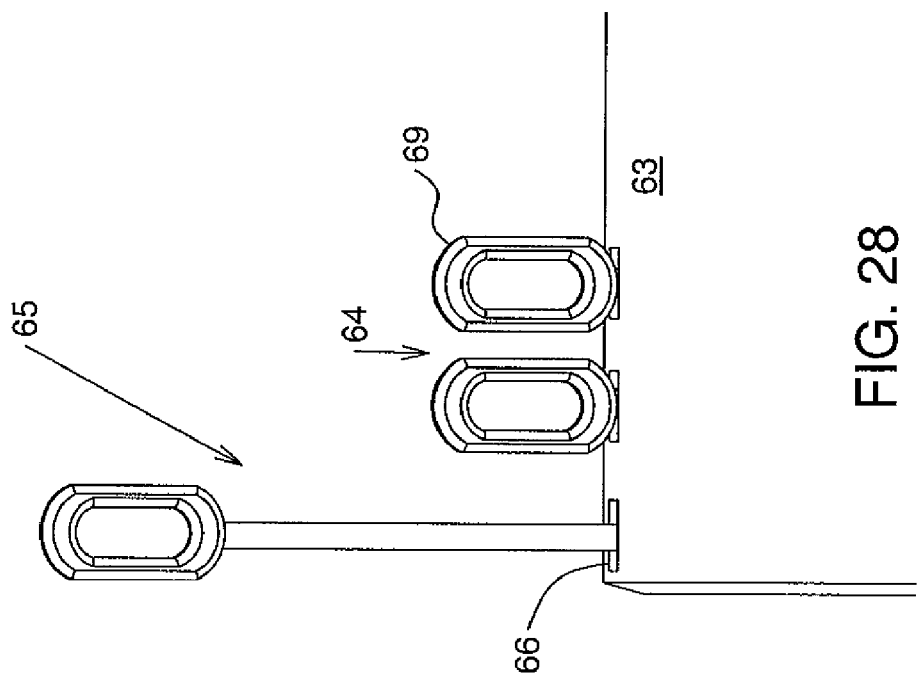
Figure 33:
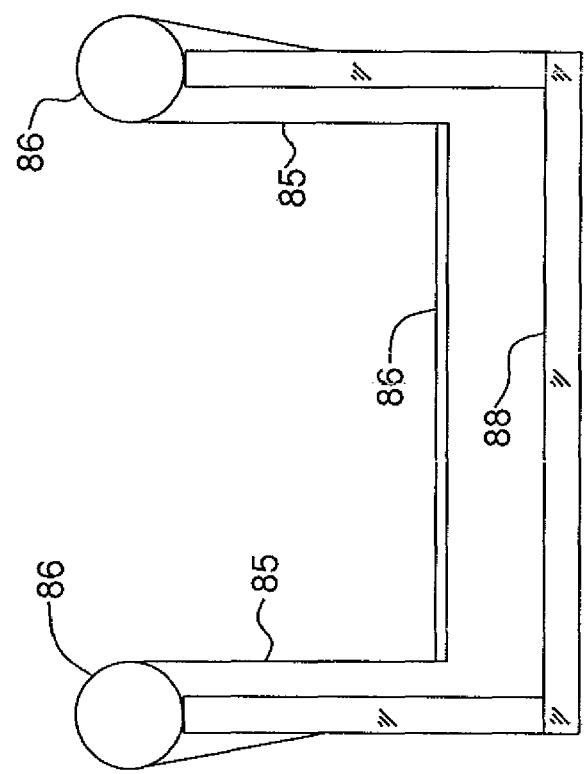
FIG. 33 is a schematic end view illustrating an arrangement conceptually similar to that of FIG. 31 but configured so that the elastic element extends to the lower portion of the suspension support elements.

The present invention provides an alternative provision for conveniently adjusting the load-to-displacement profile. FIG. 28 illustrates a redundancy of suspension elements 64 and 65 configured to enable a user to either selectively attach suspension elements with different elastic properties (e.g., rubber suspension elements of differing thicknesses) or so that the user can adjust the number of suspension elements active at any time. In either of these cases, for convenience of use, all of the suspension elements 64 and 65 are preferably permanently or semi-permanently attached to load-bearing surface 63 and are selectively attachable and releasable at the other end to the suspension support structures (not shown). In this context, "semi-permanently attached" refers to a form of attachment which is effective to maintain interconnection of the suspension elements with the base structure indefinitely during ongoing use of the dolly, but which allows disconnection, typically by use of a screwdriver or other tool, for intermittent needs such as servicing or replacement of broken or worn parts. This is in contrast to the "releasable engagement" at the other end which is configured to facilitate easy connection and disconnection of the elements, preferably by band from the suspension support structures. In certain preferred implementations of the present invention, at least a portion of some or all of the suspension element(s) not currently in use is retracted to a position underneath the load-bearing surface, as shown in FIG. 29, thereby reducing the likelihood of them being damaged and preventing them from interfering with the load on the load-bearing surface 63. In a preferred, non-limiting exemplary embodiment, an elastic biasing element 67, like a spring or tension cord, disposed so as to bias the non-engaged suspension elements 64 to slide through slots 66 in the load-bearing surface 63 along face down channels 68 disposed underneath the load-bearing surface 63 where they are held in place by the biasing element 67. The biasing element 67 is preferably weak compared to the suspension elements 64 themselves, so that it supports the intrinsic weight of the suspension element 64, bringing it close under the load-bearing surface 63 when not in use, but does not play a significant role when the corresponding suspension element 65 is operative. The upper terminal portions 69 of the suspension elements are configured not to pass through the load-bearing surface slot 66 so as to remain accessible in preparation for future engagement as shown in FIG. 28. At the time of deployment the retracted portion is drawn through the slot 63 in the load-bearing surface 63 and the connector 69 is attached to the suspension support structure (not shown) at the chosen height.

Figure 30:
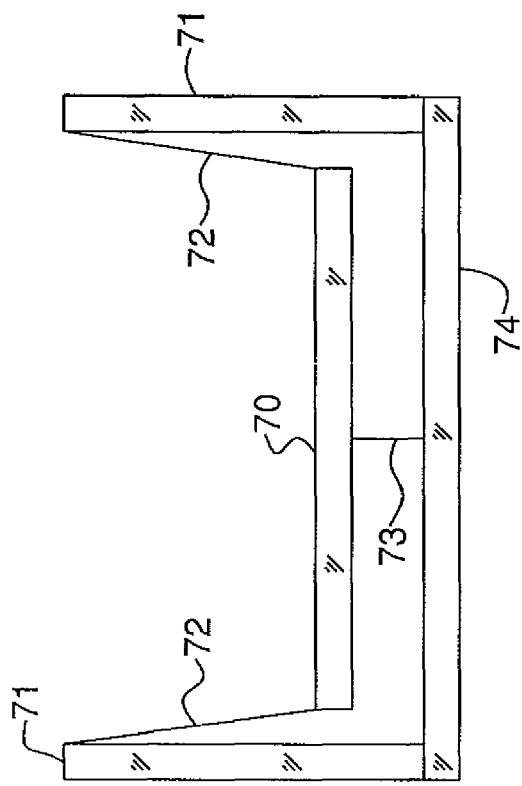
FIG. 30 is a schematic end view of the dolly of FIG. 17A illustrating an optional feature according to which an additional elastic element applies a downward tension to the load-bearing shelf against the suspension bias.

FIG. 30 illustrates an optional feature for adjusting the load-to-displacement profile of a single set of elastic suspension elements 72 according to which an elastic element 73 configured to apply a contra tension downward to the load-bearing surface 70 against the applied upward bias of the elastic suspension elements 72 thereby diminishing the effective upward tension applied to the load-bearing surface 70. This option advantageously provides the user with the ability to define an appropriate pretension for the different loads as described above. The elastic contra-tension element 73 is relatively weak compared to the tension of the suspension elements 72 so as to only diminish their applied tension without totally negating it and preferably connects to the underside of the load-bearing surface 70 and the base structure 74.

Figure 31:
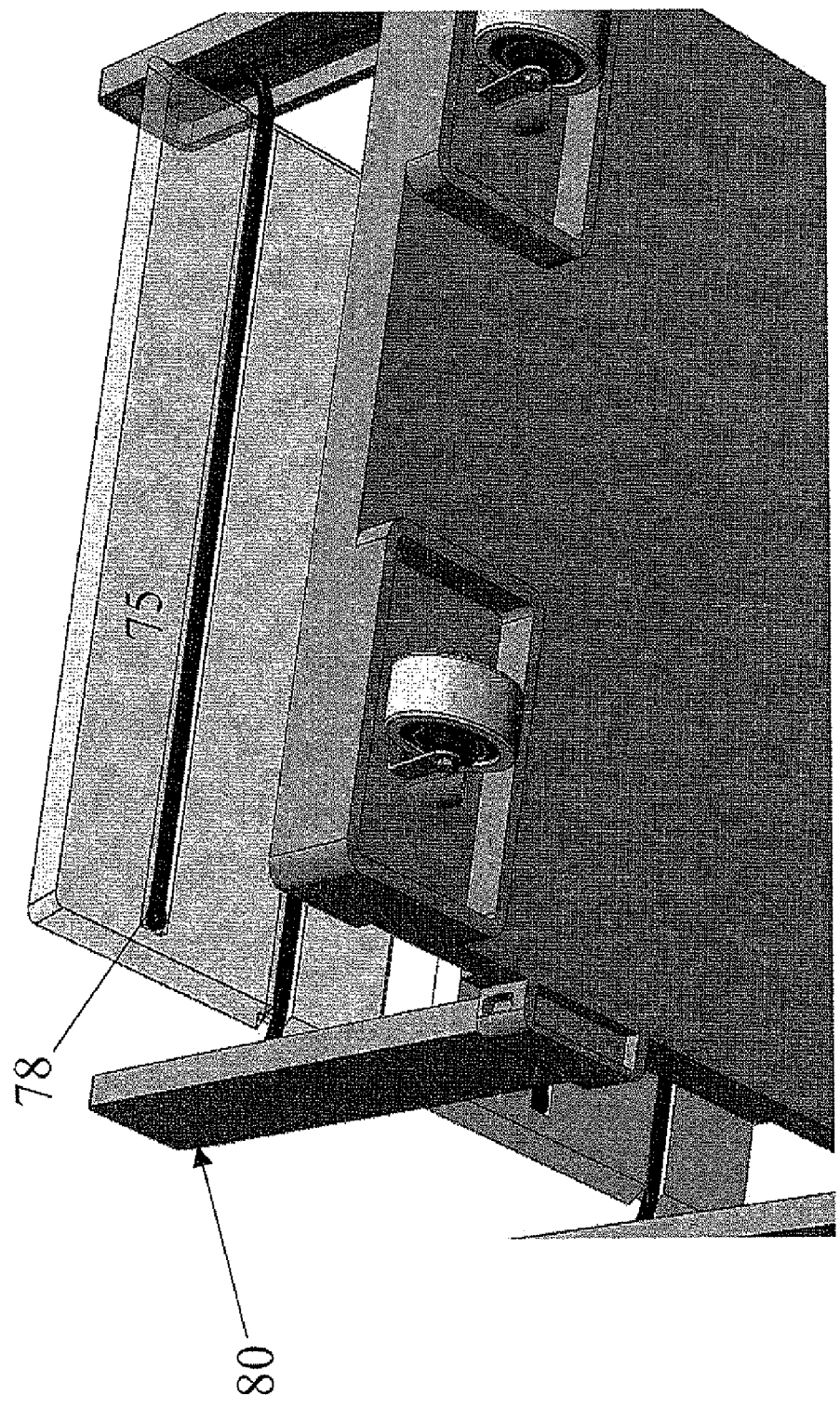
FIG. 31 is an isometric bottom view of the dolly of FIG. 17A illustrating an optional feature according to which an elastic suspension element continues underneath a load-bearing shelf to extend an effective length of the elastic suspension element.

FIG. 31 illustrates a preferred feature of the present invention providing a range of motion spanning the entire height of the suspension support structures 80. Particularly where it is desired to have the unloaded position of the load-bearing surface 75 relatively close to the top of the suspension support structures 80, the distance from the load-bearing surface 75 to the point of attachment may be only a small proportion of the total distance of travel required to reach a fully lowered (maximum capacity) state. If the maximum allowed strain on the suspension elements is roughly 3 (i.e., an extension of 200% of the original length to reach a total final length 3 times the original length), it will not be possible to set the unloaded position of the load-bearing surface 75 within the top third of the height of the suspension support structures 80 and still use the entire height of the suspension support 80 without without over-straining the suspension elements 78.

Figure 32A:
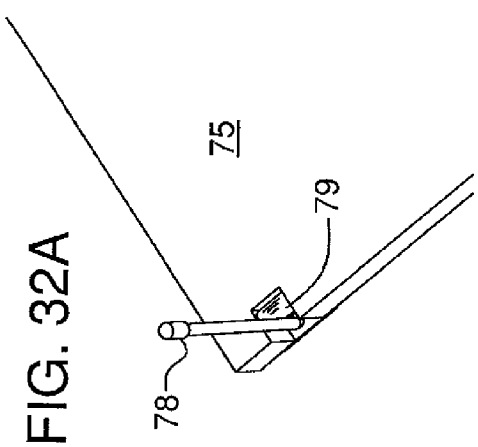
FIGS. 32A and 32B are upper and lower isometric views, respectively, of an arrangement conceptually similar to that of FIG. 27 but configured for use with the embodiment of FIG. 9A.
Figure 32C:
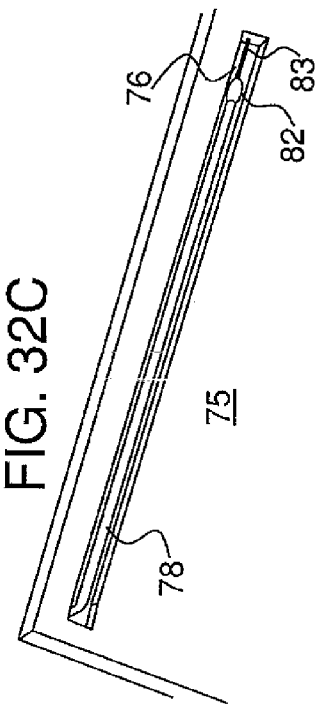
FIG. 32C is an isometric partial bottom view of a shelf provided with a retraction arrangement for an elastic suspension element continuing underneath a load-bearing shelf.
Figure 32B:
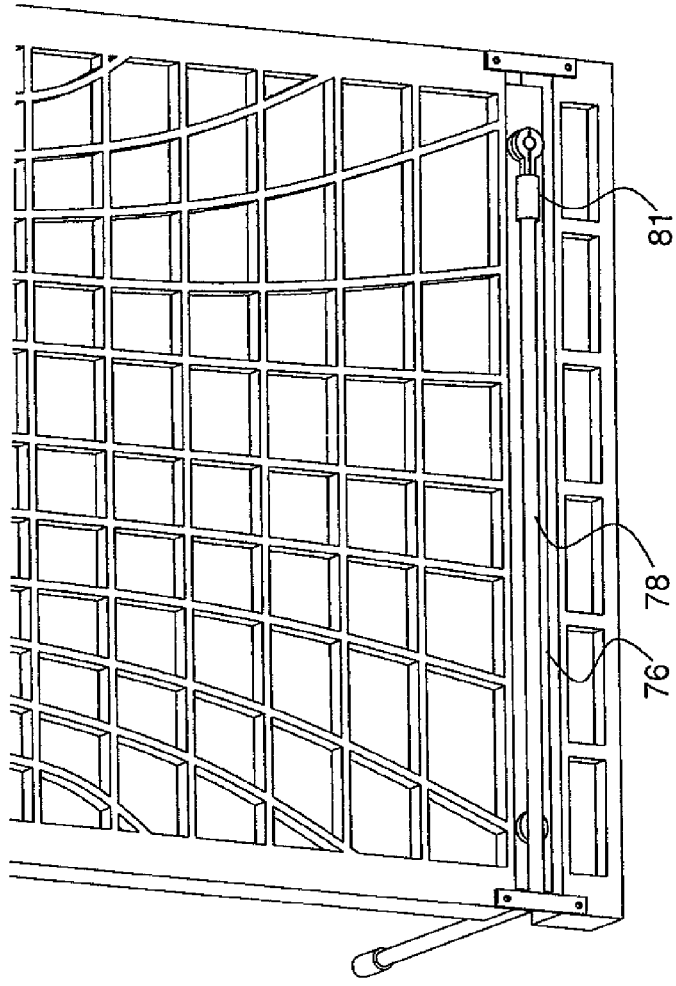

To address this problem, the present invention preferably employs suspension elements 78 engaged at a fixed location to the underside of the floor at a point substantially removed from the edge where the suspension element emerges, as shown in FIG. 32B designation "A". Such a configuration provides for elongation of both the portions of the suspension element 78 that are disposed vertically and horizontally. In a preferred embodiment, the suspension element lies within a downward facing channel 76 in the underside of the load-bearing-surface 75 and connects rigidly to the load-bearing-surface 75 at a point chosen such that the length of the suspension element 78 under the load-bearing-surface 75 actively contributing to the suspension of the load-bearing-surface 75 is at least half of the width of the load-bearing-surface 75. A low friction surface, or more preferably a roller 32A, is deployed at the edge where the suspension element 78 horizontal changes from a horizontal orientation to a vertical one, as shown in FIG. 32A, to minimize wear and tear.

Optionally the retraction feature mentioned above and illustrated in FIG. 32C may be employed in conjunction with the above-mentioned range of displacement feature. Suspension element 78 is disposed in the channel 76 so that it has a degree of freedom to slide along the channel 76. The retraction cord 83 weakly biases the suspension element 78 to slide along the channel 76 into a retracted position. A block stopper 82 is disposed on the suspension element 78 so that when the suspension element 78 is pulled along the channel 76 against the retraction bias, the block stopper 82 engages the load-bearing surface 75 at a predefined point on the suspension element 78. After connection to the container wall the suspension support structure 80 is biased to assume an upward position and when the suspension element 78 is disconnected from the suspension support structure 80 the suspension element 78 is biased to retract under the load-bearing surface 75.

The present invention discloses an variant implementation of the above described "range of displacement" feature in which each of the elastic suspension elements 86 connects at given locations on the perimeter to the load-bearing shelf 86 and continues up the length of the suspension support structure 87, passes over a low friction surface or pulley 86, and changes direction and continues downwards to an anchor point disposed in the lower portion of the support structure 87 or in the base structure 88 where it connects either permanently or detachably. In a preferred embodiment each suspension element 87 lies in a channel (not shown) running the length of each suspension support structure 87. Optionally, the suspension support elements are operative according to the above-described retraction and stopper block arrangement FIGS. 34A through 36D illustrate various connection configurations enabling convenient connection and disconnection of the elastic suspension elements to and from the suspension support structures. The connection configuration, in the implementation providing redundant, elastic-suspension elements, enables users to conveniently and quickly exchange, add, and remove sets of suspension elements to produce the desired load-to-displacement profile. In embodiments possessing a single suspension set, the connection configurations enable a user to choose a height of connection as will be discussed.

Figure 34D:
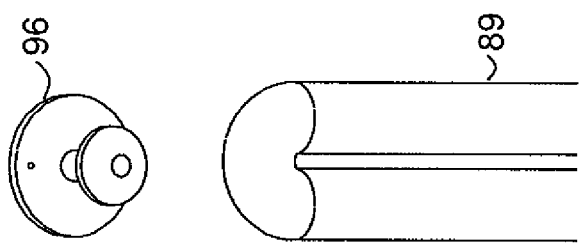
FIGS. 34A-34D are schematic illustrations of various connection configurations for attaching the elastic suspension elements to the suspension support structures in the various implementations of the present invention.
Figure 34C:
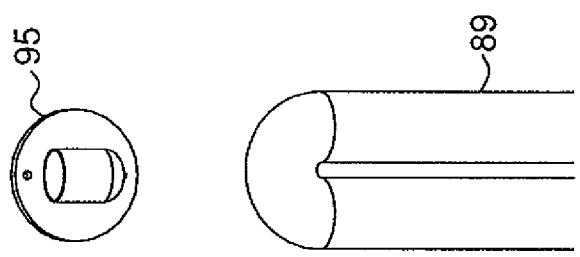
Figure 34B:
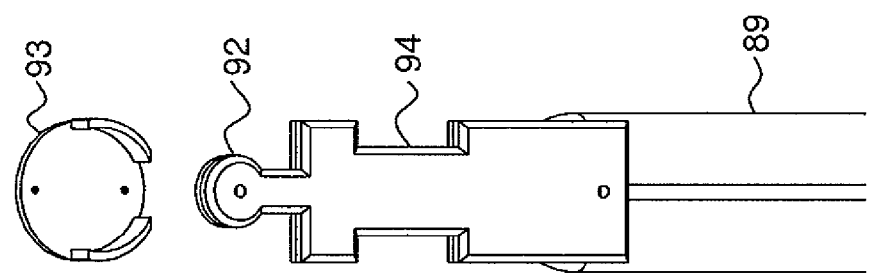
Figure 34A:
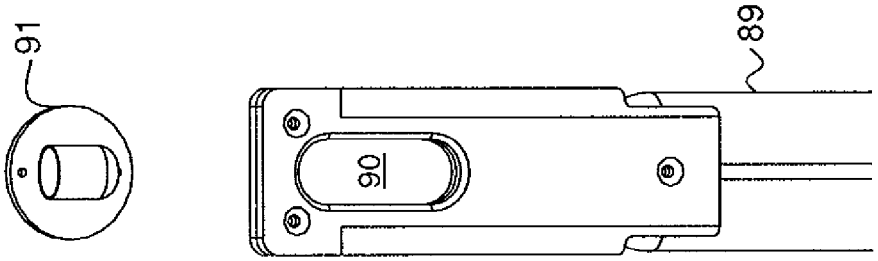
Figure 37A:
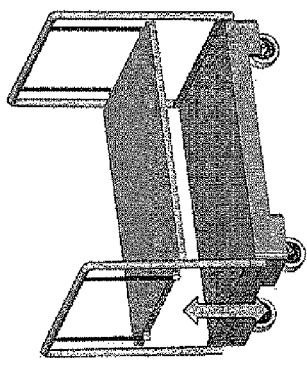
FIGS. 37A-37E are isometric views of an open frame embodiment with the load-bearing shelf at a highest, a middle, and lowest position and frame structures in a partially folded, and a fully folded state, respectively.
Figure 37B:
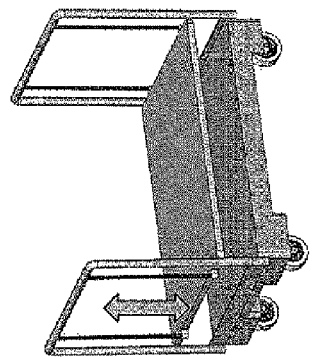
Figure 37C:
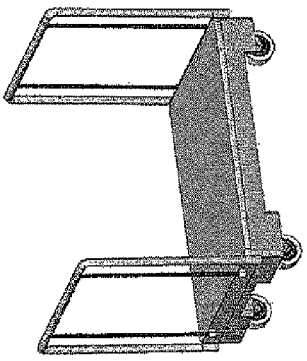
Figure 37D:
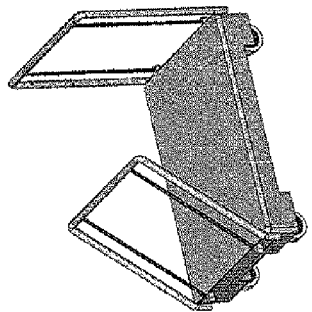
Figure 37E:
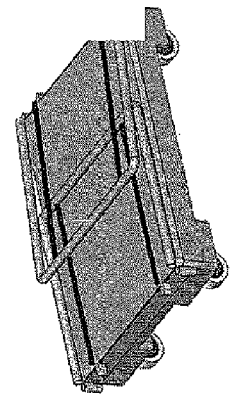

A first variant of a connection configuration includes a reinforced eyelet 90 disposed on the end of the elastic element 89 that hangs from a corresponding hook 91 mounted on suspension support structure as shown in FIG. 34A.

A second variant of a connection configuration including a grip recess 94 for gripping the suspension element 89, a head and neck shape 92, and a corresponding spaced seat structure 93 for receiving the head and neck form 92. The head and neck shape 92 and the grip recess 94 are formed as a single unit disposed on the end of the elastic element 89 as shown in FIG. 34B. The spaced seat structure 93 is disposed on the support structure. For connection, the neck portion is aligned with the space of the spaced seat structure 93 and held in place by the head portion seated within the spaced seat 93 as the weight of the load-bearing surface (and the load when loaded) pulls the head portion downwards into the seat structure 93. Detachment is accomplished by lifting the head portion out of the shaped seat 93 so that the narrower neck portion is aligned with the space of the spaced seat 93 and pulled out of the spaced seat 93. A third variant of a connection configuration includes a simple hanging arrangement in which the elastic suspension element 89 hangs from a hook 95 or a peg 96 as shown in FIGS. 34C and 34D.

FIGS. 36A and 36B illustrate an additional connection feature enabling selective connection of the elastic suspension elements to the suspension support structures 97. Such functionality enables a user to choose the unloaded height of the unloaded load-bearing surface 98 and, in connection with stopper block arrangements, to define a desired pretension acting on the load bearing surface 98.

As shown in FIG. 35B, the suspension support structure 97 includes a series of pin slots 99 for insertion of a connection pin 100 at the chosen height. Alternatively, the suspension support structures 97 include a series of predisposed pins 101 to enable selective hanging of the load-support surface 98 as shown in FIG. 36B.

It should be noted that the connection configurations of other shapes and arrangements that provided convenient, and reliable connection of the suspension elements to the support structures are enclosed within the scope of the present invention. It should be further noted that the connection configurations may be constructed of metal, hardened plastic, wood, or a combination of them, or any other materials providing the functionality associated with such materials.

FIGS. 37A through 37E depict a frame-like support structure embodiment in which the load-bearing surface is disposed at non-loaded, partially loaded, and fully loaded states and in erected, partially folded, and fully folded positions. The open frame embodiment illustrates another of the many embodiment enclosed with the scope of the present invention.

Additional embodiments also included in the present invention include a single support embodiment providing a single, foldable suspension support structure disposed in the middle of the footprint. The trunk of the main support branches out, at a chosen height, into at least four branches. Each branch provides a separate point of suspension from which the load bearing surface is suspended.

An additional embodiment included in the current invention is equipped with detachable support suspension support structures configured to be attachable to the base structure.

It will be clear to one ordinarily skilled in the art that many other implementations of suspension-element length adjustment mechanisms are possible. By way of a further non-limiting example, a similar result may be achieved by use of a scissors mechanism under the load-bearing surface.

What is claimed is:

1. A non-enclosed load-bearing structure for handling materials comprising:
   (a) a base structure,
   (b) a suspension support arrangement connected to said base structure, said suspension support arrangement being configured to provide a plurality of suspension locations, said suspension support arrangement being implemented as a folding entity deployable between an upright support-providing position and a folded position,
   (c) at least one load-bearing surface vertically displaceable relative to said support arrangement, and
   (d) a suspension arrangement including a plurality of elastic suspension elements, said elastic suspension elements being deployed so as to suspend said at least one load-bearing surface relative to said suspension locations such that, when said load-bearing surface is loaded with a load, said load-bearing surface assumes a lowered position and, when a part of the load is removed, said suspension arrangement raises said load-bearing surface towards a raised position, wherein said base structure, said suspension support arrangement, said at least one load-bearing surface and said suspension arrangement provide a non-enclosed load-bearing structure selected from the group comprising: a dolly; and a pallet.

2. The non-enclosed load-bearing structure of claim 1 further comprising providing wheels disposed on said base structure so said load-bearing structure operatives as a dolly.

3. The non-enclosed load-bearing structure of claim 1 further comprising a spacer arrangement fixedly attached to said base structure so said load-bearing structure operates as a pallet.

4. The non-enclosed load-bearing structure of claim 1, wherein said suspension support arrangement is implemented as a detachable structure deployed by attachment to said base structure.

5. The non-enclosed load-bearing structure of claim 1, wherein said folding entity includes at least one pair of folding support structures disposed on opposite sides of said base structure.

6. The non-enclosed load-bearing structure of claim 5, wherein said pair of folding support structures are implemented outside a rectangle best approximating the usable area of said load-bearing surface so as to provide a maximum amount of said load-bearing surface as usable area.

7. The non-enclosed load-bearing structure of claim 5, wherein said pair of folding support structures are implemented on the inside of a rectangle best approximating the usable surface of said load-bearing surfaces so as to enable adjacent arrangement of a plurality said load-bearing structures.

8. The non-enclosed load-bearing structure of claim 5, wherein said pair of folding support structures disposed on opposite sides of said load-bearing structure are positioned so as to fold into non-overlapping folded positions.

9. The non-enclosed load-bearing structure of claim 5, wherein said pair of folding support structures disposed on opposite sides of said load-bearing structure are positioned opposite each other and hinged so as to fold into non-overlapping folded positions.

10. The non-enclosed load-bearing structure of claim 5 wherein said pair of folding support structures disposed on opposite sides of said load-bearing structure are positioned opposite each other wherein the pivot arrangement of a first of said folding support structures is disposed higher than the pivot arrangement of a second of said folding support structure so as to enable said pair of folding support structures to fold into an overlapping folded position.

11. The non-enclosed load-bearing structure of claim 5, wherein said pair of folding support structures and said vertically displaceable, load-bearing surface are implemented so as to enable the folding of support structures while said load-bearing surfaces are in a raised position.

12. The non-enclosed load-bearing structure of claim 5, wherein said pairs of support structures are implemented so as to extend around at least one corner of said load-bearing structure so as to isolate protruding corners of materials loaded on said load-bearing surface from items in the area surrounding said load-bearing structure.

13. The non-enclosed load-bearing structure of claim 5, further comprising a vertical partition disposed between two of said load-bearing surfaces suspended by said suspension arrangement so as to isolate materials loaded on a first of said load-bearing surfaces from materials loaded on a second of said load bearing surfaces.

14. The non-enclosed load-bearing structure of claim 5, wherein said pair of support structures includes a stopper arrangement of stopper blocks, each of said stopper blocks being attached to each of said support structures so as to define a fully raised position.

15. The load bearing structures of claim 5, further comprising a connection arrangement including a series of engagement configurations disposed along the length of each of said elastic suspension elements and a complementary configuration is disposed in each of said support structures so that said elastic suspension elements may be selectively connected to said support structures.

16. The load bearing structure of claim 5, further including a connection arrangement including a series of engagement configurations disposed along the height of each of said support structures and a corresponding configuration disposed on each of said elastic suspension elements so that said elastic suspension elements may be selectively connected to said support structures.

17. The non-enclosed load-bearing structure of claim 5, wherein said pairs of support structures are implemented as elongated pairs of support structures including a plurality of vertical slots spaced-apart wherein said vertical slots are engaged by pins associated with said load-bearing surfaces so as to maintain a horizontal orientation of said load-bearing surface moving along said vertical slots and to define a fully raised position.

18. The non-enclosed load-bearing structure of claim 1 wherein said at least one load-bearing surface includes a shelf spanning at least one horizontal dimension of said load-bearing surface.

19. The non-enclosed load-bearing structure of claim 18, wherein said shelf further includes said elastic suspension elements disposed such that the lower extremity of each said suspension elements are rigidly fixed to the underside of said shelf at point removed from the edge where said elastic suspension elements emerge from said shelf wherein said point of attachment is greater than the width of said shelf thereby providing elastic elongation along both the horizontal and the vertical lengths of said elastic suspension elements.

20. The non-enclosed load-bearing structure of claim 1 wherein said at least one load-bearing surface includes catch structures configured to hold an adapted carry structure.

21. The non-enclosed load-bearing structure of claim 1 wherein said at least one load-bearing surface is implemented as an adapted shelf separate from said load-bearing structure wherein each of two opposing edge surfaces of said adapted shelf possesses a shape complementary to said support structures so as to maintain a horizontal orientation of said adapted shelf while moving vertically along said pair of support structures.

22. The non-enclosed load-bearing structure of claim 1 wherein said at least one load-bearing surface is implemented as a base of a container separate from said load-bearing structure bearing structure of claim 1, wherein said suspension arrangement further includes an adjustment mechanism disposed in said load-bearing surface, said adjustment mechanism being configured for adjusting an effective length of said elastic suspension elements.

23. The non-enclosed load-bearing structure of claim 22, wherein said adjustment mechanism is configured to adjust an effective length of said elastic suspension elements between an operative length wherein said at least one load-bearing surface is elastically biased towards a raised position and an operative length wherein said at least one load-bearing surface assumes said lowered position even in the absence of an applied load.

24. The non-enclosed load-bearing structure of claim 22, wherein said adjustment mechanism is configured to simultaneously adjust an effective length of all of said elastic suspension elements.

25. The non-enclosed load-bearing structure of claim 22, wherein said adjustment mechanism is configured to simultaneously adjust an effective length of all of said elastic suspension elements substantially equally.

26. The non-enclosed load-bearing structure of claim 22, wherein said adjustment mechanism includes a rotatable drum associated with said at least one load-bearing surface, each of said elastic suspension elements being linked to said drum so that rotation of said drum effects simultaneous adjustment of an effective length of all of said elastic suspension elements.

27. The non-enclosed load-bearing structure of claim 26, wherein said adjustment mechanism further includes a handle accessible from an upper surface of said at least one load-bearing surface for manually rotating said drum.

28. The non-enclosed load-bearing structure of claim 26, wherein said adjustment mechanism further includes a locking arrangement for locking said drum in at least one position relative to said at least one load-bearing surface.

29. The non-enclosed load-bearing structure of claim 26, wherein said adjustment mechanism further includes a ratchet arrangement for allowing rotation of said drum to shorten an effective length of said elastic suspension elements and to inhibit rotation of said drum to lengthen an effective length of said elastic suspension elements.

30. The non-enclosed load-bearing structure of claim 29, wherein said adjustment mechanism further includes a ratchet override mechanism selectively operable to release said ratchet arrangement to allow rotation of said drum to lengthen an effective length of said elastic suspension elements.

31. The non-enclosed load-bearing structure of claim 1, wherein said plurality of elastic suspension elements includes redundant sets of said elastic suspension elements, said redundant sets being configured so that selective deployment of each of said sets defines a new load-to-displacement profile for said at least one load-bearing surface.

32. The non-enclosed load-bearing structure of claim 31, wherein said redundant sets of said elastic suspension elements include a plurality of subsets of said elastic suspension elements, each of said subsets being configured to provide identical load-to-displacement profiles when deployed.

33. The non-enclosed load-bearing structure of claim 32, wherein said plurality of subsets of said elastic suspension elements are configured to be concurrently deployable.

34. The non-enclosed load-bearing structure of claim 31, further comprising biasing units associated with each of said redundant sets of elastic suspension elements, said biasing units being configured to retract each of said elastic suspension elements underneath associated at least one load-bearing surface when said elastic suspension elements are in an non-deployed state.

35. The load bearing structure of claim 1, further comprising at least one roller blind for providing a display front, said roller blind being configured to unwind from a roller into an extended position spanning the height between said at least one load-bearing surface and said load-bearing structure as said at least one floor moves upwards and rewinds onto said roller as said at least one load-bearing surface moves downwards.

36. The load bearing structure of claim 1, wherein each of said elastic suspension elements is anchored at an anchoring location associated with said support arrangement in spaced relation to the corresponding one of said suspension locations such that a first portion of said elastic suspension element extends from said anchoring location to said suspension location and a second portion of said elastic suspension element extends from said suspension location to said load-bearing surface, both said first and second portions of said elastic suspension element being tensioned by application of a load to said load-bearing surface.

37. A non-enclosed load-bearing structure for handling materials comprising:
(a) a base structure,
(b) a suspension support arrangement implemented as a folding structure deployable between an upright support-providing position and a folded position,
(c) at least one load bearing-surface vertically displaceable relative to said support arrangement,
(d) a suspension arrangement including a plurality of elastic suspension elements, said elastic suspension elements being deployed so as to suspend said at least one load-bearing surface relative to said support arrangement such that, when said load-bearing surface is loaded with a load, said load-bearing surface assumes a lowered position and, when a part of the load is removed, said suspension arrangement raises said load-bearing surface towards a raised position,
wherein said base structure, said suspension support arrangement, said at least one load-bearing surface and said suspension arrangement provide a non-enclosed load-bearing structure selected from the group comprising: a dolly; and a pallet.

* * * * *